US012491717B2

(12) United States Patent
Chang et al.

(10) Patent No.: US 12,491,717 B2
(45) Date of Patent: Dec. 9, 2025

(54) INKJET HEAD DEVICE

(71) Applicant: LG ELECTRONICS INC., Seoul (KR)

(72) Inventors: Wonjae Chang, Seoul (KR); Jinsung Kim, Seoul (KR); Byungjun Kang, Seoul (KR); Myoungsoo Kim, Seoul (KR); Junghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 18/034,782

(22) PCT Filed: Nov. 6, 2020

(86) PCT No.: PCT/KR2020/015479
§ 371 (c)(1),
(2) Date: May 1, 2023

(87) PCT Pub. No.: WO2022/097787
PCT Pub. Date: May 12, 2022

(65) Prior Publication Data
US 2023/0415483 A1 Dec. 28, 2023

(51) Int. Cl.
*B41J 2/14* (2006.01)
*B41J 2/045* (2006.01)
(Continued)

(52) U.S. Cl.
CPC ........... *B41J 2/145* (2013.01); *B41J 2/04573* (2013.01); *B41J 2/10* (2013.01)

(58) Field of Classification Search
CPC ... B41J 2/04573; B41J 2/04; B41J 2/01; B41J 2/02; B41J 2/145; B41J 2/10;
(Continued)

(56) References Cited

U.S. PATENT DOCUMENTS

2011/0008541 A1 1/2011 Madigan et al.
2018/0138157 A1 5/2018 Im et al.
(Continued)

FOREIGN PATENT DOCUMENTS

JP 2012-525505 A 10/2012
JP 6077330 * 2/2017 ................ B41J 2/01
(Continued)

*Primary Examiner* — Kristal Feggins
(74) *Attorney, Agent, or Firm* — Birch, Stewart, Kolasch & Birch, LLP

(57) ABSTRACT

An inkjet head device comprises a body comprising light emitting devices, a nozzle installed on a lower side of the body to spray the light emitting devices onto the substrate in units of droplets, and a first guide part disposed in the body to guide the light emitting devices to the nozzle in a line. Since the light emitting devices arranged in a line by the first guide part are dropped on the substrate in units of a predetermined amount of droplets, the number of light emitting devices included in each droplet may be the same or similar. Thus, since the same or similar number of light-emitting elements are disposed or aligned in each sub-pixel, the luminance in each sub-pixel obtained by the light-emitting elements can be uniform.

10 Claims, 24 Drawing Sheets

(51) Int. Cl.
*B41J 2/10* (2006.01)
*B41J 2/145* (2006.01)

(58) Field of Classification Search
CPC . B41J 2202/09; B41J 2/135; B41J 2/14; B41J 2/14008; B41J 2/14016; B41J 2/14201; B41J 2/14314
See application file for complete search history.

(56) References Cited

U.S. PATENT DOCUMENTS

| | | | |
|---|---|---|---|
| 2019/0378953 | A1 | 12/2019 | Min et al. |
| 2021/0336142 | A1 | 10/2021 | Jeong et al. |

FOREIGN PATENT DOCUMENTS

| | | | | | |
|---|---|---|---|---|---|
| JP | 6077330 | B2 | | 2/2017 | |
| KR | 10-1482951 | B1 | | 1/2015 | |
| KR | 101482951 | | * | 1/2015 | ............ H05K 1/097 |
| KR | 10-2018-0055021 | A | | 5/2018 | |
| KR | 10-2019-0140545 | A | | 12/2019 | |
| KR | 10-2020-0031743 | A | | 3/2020 | |
| KR | 10-2020-0034897 | A | | 4/2020 | |

* cited by examiner

INKJET HEAD DEVICE

CROSS REFERENCE TO RELATED APPLICATIONS

This application is the National Phase of PCT International Application No. PCT/KR2020/015479, filed on Nov. 6, 2020, all of which is hereby expressly incorporated by reference into the present application.

BACKGROUND

Technical Field

The embodiment relates to an inkjet head device.

Discussion of the Related Art

A display device displays a high-quality image by using a self-light emitting device such as a light emitting diode as a light source of a pixel. The light emitting diode has excellent durability, long lifespan, and high luminance even under harsh environmental conditions, and are in the limelight as a light source for next-generation display devices.

Recently, a super small-sized light emitting diode is manufactured using a material having a highly reliable inorganic crystal structure, and the super small-sized light emitting diode is disposed on a panel of a display device (hereinafter referred to as a "display panel") such that a light source is manufactured and research is being conducted to use it as a next-generation light source for pixel.

In order to implement high resolution, a size of pixel is gradually getting smaller, and a number of light emitting devices are arranged in the pixel of such a reduced size. Accordingly, research on the manufacture of super small-sized light emitting diode as small as micro or nano scale is being actively conducted.

A display panel comprises millions of pixels. A plurality of light emitting devices are disposed in each sub-pixel of these pixels to provide luminance to each sub-pixel. In order to have the same luminance in each sub-pixel, the same number of light emitting devices should be provided in each sub-pixel.

However, it is difficult to maintain the same number of light emitting devices in each sub-pixel. By using an inkjet head device, droplets including light emitting devices are dropped onto a substrate, and light emitting devices are disposed in each sub-pixel. That is, a plurality of light emitting devices are randomly positioned on droplets in the inkjet head device without directionality, and the light emitting devices positioned in random directions are dropped onto the substrate in units of droplets. In this case, since the number of light emitting devices included in each droplet unit dropped on the substrate is different, the number of light emitting devices disposed in each sub-pixel is inevitably different.

As described above, since the number of light emitting devices disposed in each sub-pixel is different, the luminance of each sub-pixel is different. Thus, it is difficult to secure uniform luminance for each sub-pixel of the pixel.

Meanwhile, since the light emitting devices positioned in random directions in the inkjet head device are dropped onto the substrate as described above, there is a problem in that the degree of alignment of the light emitting devices is lowered.

SUMMARY

An object of the embodiment is to solve the foregoing and other problems.

Another object of the embodiment is to provide an inkjet head device having the same or similar number of light emitting devices in each sub-pixel of a pixel.

Another object of the embodiments is to provide an inkjet head device capable of securing uniform luminance for each sub-pixel of a pixel.

Another object of the embodiments is to provide an inkjet head device capable of improving the degree of alignment of light emitting devices in each sub-pixel.

The technical problem of the embodiment is not limited to those described in this section, and include those that can be grasped through the description of the invention.

According to one aspect of the embodiment to achieve the above or other object, an inkjet head device comprises: a body comprising light emitting devices; a nozzle installed on a lower side of the body to spray the light emitting devices onto the substrate in units of droplets; and a first guide part disposed in the body to guide the light emitting devices to the nozzle in a line.

Advantageous Effects

Effects of the inkjet head device according to the embodiment are described below.

According to at least one of the embodiments, since light emitting devices aligned in a line by the first guide part are dropped on the substrate in units of a certain amount of droplets, the number of light emitting devices included in each droplet may be the same or similar. Accordingly, droplets of a predetermined number of times are filled with the same or similar droplets in each sub-pixel on the substrate, and the number of light emitting devices included in each droplet is also the same or similar. Since the same or similar number of light emitting devices are disposed or aligned in each sub-pixel, the luminance in each sub-pixel obtained by these light emitting devices can be uniform.

According to at least one of the embodiments, the light emitting devices arranged in a line in the body may be dropped in a direction perpendicular to the first electrode and the second electrode on the substrate, and these dropped light emitting devices may be aligned between the first electrode and the second electrode as they are due to the dielectrophoretic force between the first electrode and the second electrode. Accordingly, the degree of alignment of the light emitting devices in each sub-pixel may be improved. In this way, since the degree of alignment of the light emitting devices in each sub-pixel is improved, the luminance in each sub-pixel can be remarkably increased.

According to at least one of the embodiments, even if the light emitting device sticked to the first guide part is temporarily detached from the first guide part, the detached light emitting device does not move far from the first guide part by the second guide part and can stick to the first guide part again. Accordingly, the second guide part may ensure that the light emitting devices are continuously aligned in a line with the first guide part.

According to at least one of the embodiments, the first guide part reciprocates in the vertical direction so that the light emitting devices in the body may be put on the substrate in a state in which they are aligned in a line. Accordingly, the uniformity of luminance of each sub-pixel of the substrate is secured, and the degree of alignment of the light emitting devices in each sub-pixel of the substrate is increased, thereby improving luminance.

According to at least one of the embodiments, the first guide part is circulated in a conveyor manner, and the light emitting devices in the body may be put on the substrate in a state in which they are aligned in a line. Accordingly, the uniformity of luminance of each sub-pixel of the substrate is secured, and the degree of alignment of the light emitting device in each sub-pixel of the substrate is increased, thereby improving luminance.

A further scope of applicability of the embodiment will become apparent from the detailed description that follows. However, since various changes and modifications within the spirit and scope of the embodiment can be clearly understood by those skilled in the art, it should be understood that the detailed description and specific embodiment, such as preferred embodiment, are given by way of example only.

DETAILED DESCRIPTION OF THE EMBODIMENTS

Hereinafter, the preferred embodiment of the present disclosure will be described in detail with reference to the accompanying drawings. However, the technical idea of the present disclosure is not limited to some of the described embodiments, but may be implemented in a variety of different forms, and if it is within the scope of the technical idea of the present disclosure, one or more of the elements among the embodiments can be used by selectively combining and substituting. In addition, terms (including technical and scientific terms) used in the embodiment of the present disclosure may be interpreted in a meaning that can be generally understood by those of ordinary skill in the art to which the present disclosure belongs, unless explicitly specifically defined and described, and commonly used terms, such as terms defined in a dictionary, can be interpreted in consideration of contextual meanings of related technologies. Also, terms used in the embodiment of the present disclosure are for describing the embodiment and are not intended to limit the present disclosure. In this specification, the singular form may also include the plural form unless otherwise specified in the phrase, and when described as "at least one (or one or more) of B and C", it can include one or more of any combination that may be combined with A, B, and C. In addition, terms such as first, second, A, B, (a), and (b) may be used to describe elements of an embodiment of the present disclosure. These terms are only used to distinguish the element from other elements, and the term is not limited to the nature, order, or sequence of the corresponding element. In addition, when a element is described as being 'connected', 'coupled' or 'joined' to the other element, it may include a case where the element is not only directly 'connected', 'combined', or 'joined' to the other element, but also a case where a element is 'connected', 'combined', or 'joined' to the other element through another element. In addition, when it is described as being formed or disposed on the "top (upper) or bottom (lower)" of each element, it may include a case where two elements are not only in direct contact with each other, but also a case where another element is formed or disposed between two elements. In addition, when expressed as "up (up) or down (down)", it may include the meaning of not only the upward direction but also the downward direction based on one element.

Figure 1:
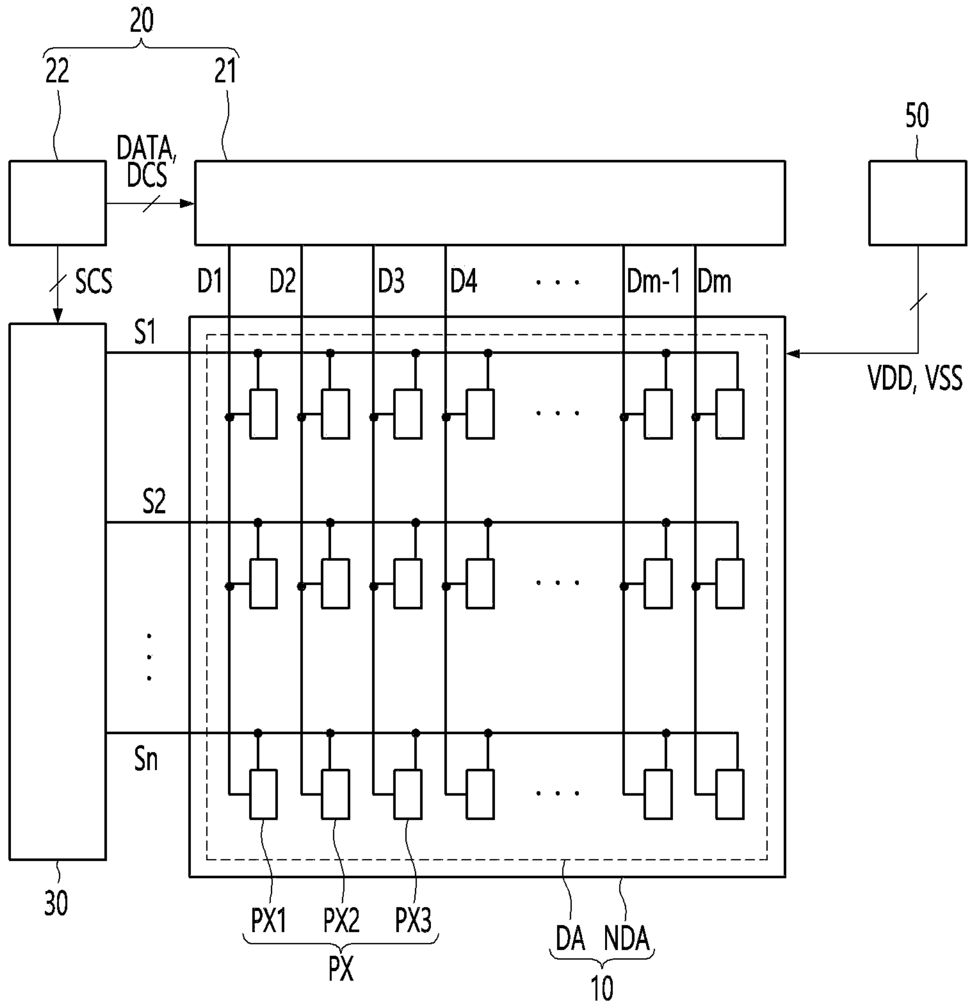
FIG. 1 is a schematic block diagram of a display device according to an embodiment.
Figure 2:
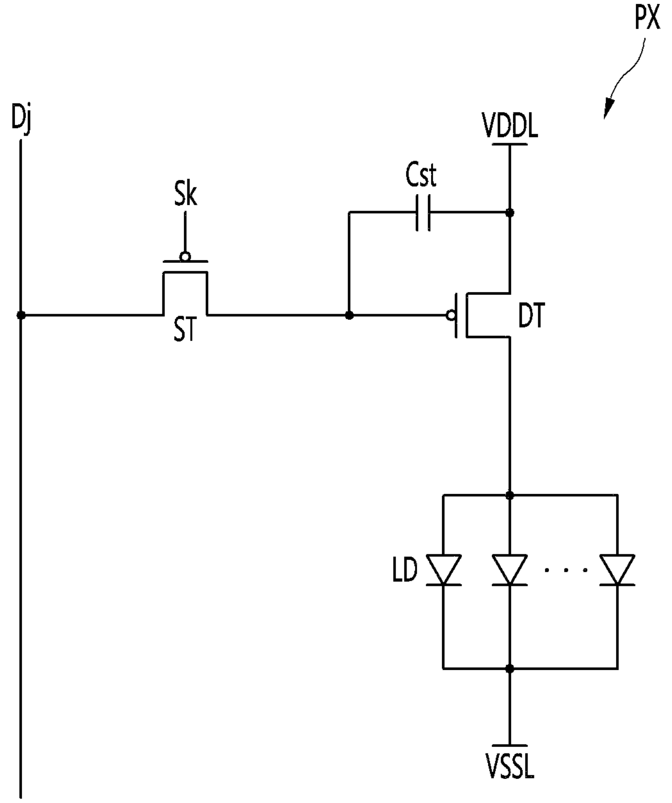
FIG. 2 is a circuit diagram illustrating an example of a pixel of FIG. 1.

FIG. 1 is a schematic block diagram of a display device according to an embodiment, and FIG. 2 is a circuit diagram illustrating an example of a pixel of FIG. 1.

Referring to FIG. 1 and FIG. 2, a display device according to the embodiment may comprise a display panel 10, a driving circuit 20, a scan driving circuit 30 and a power supply circuit 50.

The driving circuit 20 may include a data driving circuit 21 and a timing controller 22.

The display panel 10 may have a rectangular shape and a planar shape. The planar shape of the display panel 10 is not limited to the rectangular shape, and may be formed into polygonal, circular or elliptical shapes. At least one side of the display panel 10 may be formed to be bent with a predetermined curvature.

The display panel 10 may be divided into a display area DA and a non-display area NDA disposed around the display area DA. The display area DA is an area where the pixels PX are formed to display an image. The display panel 10 may comprise data lines (D1 to Dm, where m is an integer greater than or equal to 2), scan lines (S1 to Sn, where n is an integer greater than or equal to 2) crossing the data lines (D1 to Dm), a high potential voltage line VDDL supplied with a high potential voltage, a low potential voltage line VSSL supplied with a low potential voltage, and pixels PX connected to the data lines D1 to Dm and the scan lines S1 to Sn.

Each of the pixels PX may comprise a first sub-pixel PX1, a second sub-pixel PX2, and a third sub-pixel PX3. The first sub-pixel PX1 may emit a first color light, the second sub-pixel PX2 may emit of a second color light, and the third sub-pixel PX3 may emit a third color light. The first color light may be red light, the second color light may be green light, and the third color light may be blue light, but are not limited thereto. In addition, in FIG. 2, it is illustrated that each of the pixels PX comprise three sub-pixels, but are not limited thereto. That is, each of the pixels PX may comprise four or more sub-pixels.

Figure 3:
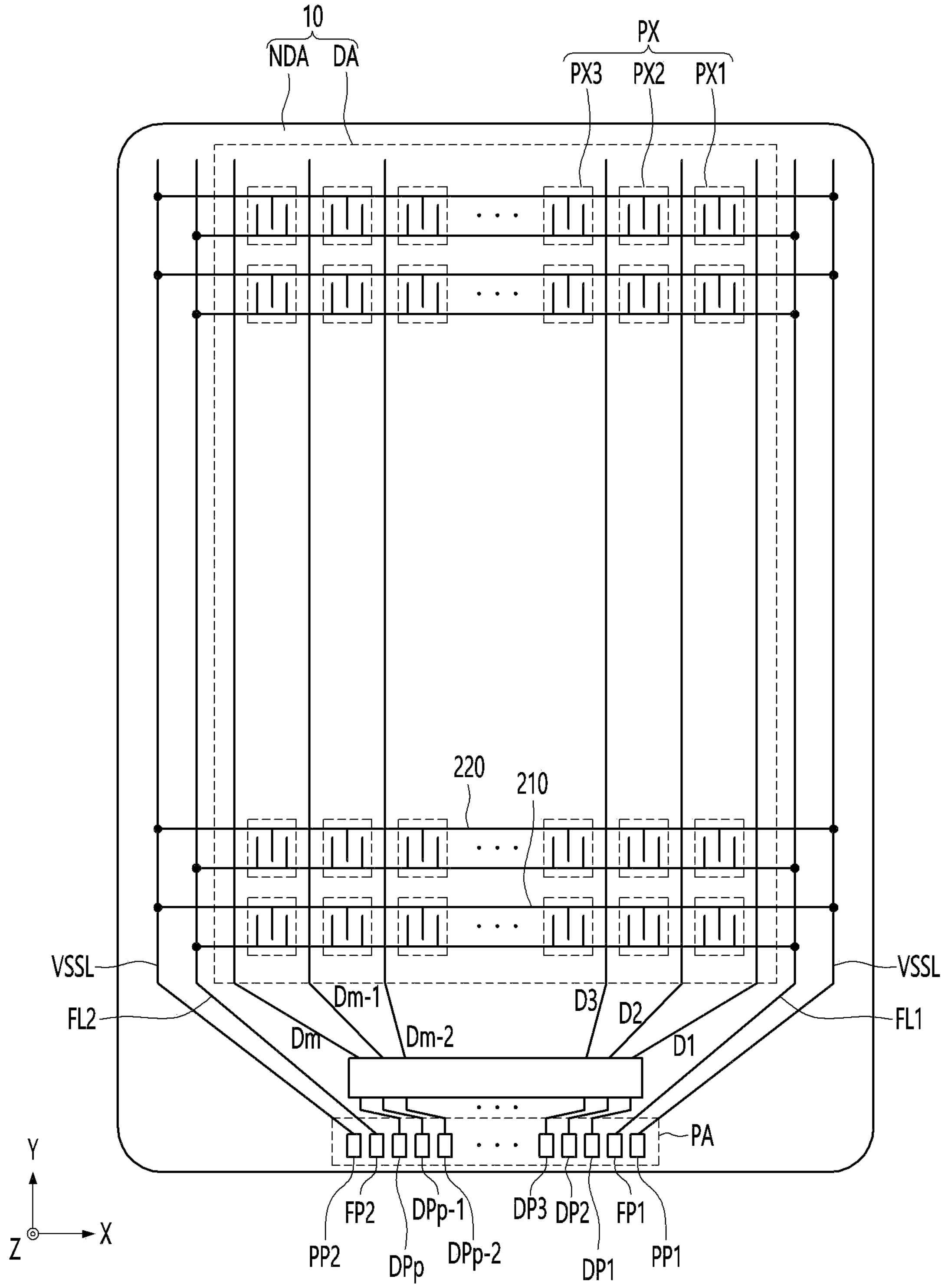
FIG. 3 is a plan view showing the display panel of FIG. 1 in detail.

Each of the first sub-pixel PX1, the second sub-pixel PX2, and the third sub-pixel PX3 may be connected to at least one of the data lines D1 to Dm, at least one of the scan lines S1 to Sn, and a high potential voltage line VDDL. As shown in FIG. 3, the first sub-pixel PX1 may include light emitting devices LDs, a plurality of transistors for supplying current to the light emitting devices LDs, and at least one capacitor.

Each of the light emitting devices LD may be an inorganic light emitting diode that includes a first electrode, an inorganic semiconductor, and a second electrode. Here, the first electrode may be an anode electrode, and the second electrode may be a cathode electrode.

The plurality of transistors may include a driving transistor DT supplying current to the light emitting devices LD and a scan transistor ST supplying a data voltage to a gate electrode of the driving transistor DT, as shown in FIG. 3. The driving transistor DT has a gate electrode connected to the source electrode of the scan transistor ST, a source electrode connected to the high potential voltage line VDDL to which a high potential voltage is applied, and a drain electrode connected to the first electrodes of the light emitting devices LD. The scan transistor ST has a gate electrode connected to the scan line (Sk, k is an integer that satisfies $1 \leq k \leq n$), a source electrode connected to the gate electrode of the driving transistor DT, and a drain electrode connected to the data lines (Dj, j an integer that satisfies $1 \leq j \leq m$).

The capacitor Cst is formed between the gate electrode and the source electrode of the driving transistor DT. The storage capacitor Cst stores a difference voltage between the gate voltage and the source voltage of the driving transistor DT.

The driving transistor DT and the scan transistor ST may be formed of a thin film transistor. In addition, in FIG. 3, the driving transistor DT and the scan transistor ST have been mainly described as being formed of P-type MOSFETs (Metal Oxide Semiconductor Field Effect Transistors), but are not limited thereto. The driving transistor DT and the scan transistor ST may be formed of N-type MOSFETs. In this case, positions of the source electrode and the drain electrode of each of the driving transistor DT and the scan transistor ST may be changed.

In addition, in FIG. 2, it is illustrated that each of the first sub-pixel PX1, the second sub-pixel PX2, and the third sub-pixel PX3 includes 2T1C (2 Transistor-1 capacitor) having one driving transistor DT, one scan transistor ST, and one capacitor Cst, but is not limited thereto. Each of the first sub-pixel PX1, the second sub-pixel PX2, and the third sub-pixel PX3 may include a plurality of scan transistors ST and a plurality of capacitors Cst.

Since the second sub-pixel PX2 and the third sub-pixel PX3 may be expressed with substantially the same circuit diagram as the first sub-pixel PX1, detailed descriptions will be omitted.

The driving circuit 20 outputs signals and voltages for driving the display panel 10. To this end, the driving circuit 20 may include a data driving circuit 21 and a timing controller 22.

The data driving circuit 21 receives digital video data DATA and a source control signal DCS from the timing controller 22. The data driving circuit 21 converts the digital video data DATA into analog data voltages according to the source control signal DCS and supplies them to the data lines D1 to Dm of the display panel 10.

The timing controller 22 receives digital video data DATA and timing signals from a host system. The timing signals may include a vertical synchronization signal, a horizontal synchronization signal, a data enable signal, and a dot clock. The host system may be an application processor of a smart phone or tablet PC, a system on chip of a monitor or TV, or the like.

The timing controller 22 generates control signals for controlling operation timings of the data driving circuit 21 and the scan driving circuit 30. The control signals may include a source control signal DCS for controlling the operation timing of the data driving circuit 21 and a scan control signal SCS for controlling the operation timing of the scan driving circuit 30.

The driving circuit 20 may be disposed in the non-display area NDA provided on one side of the display panel 10. The driving circuit 20 may be formed of an integrated circuit (IC) and mounted on the display panel 10 using a chip on glass (COG) scheme, a chip on plastic (COP) scheme, or an ultrasonic bonding scheme, but is not limited thereto. For example, the driving circuit 20 may be mounted on a circuit board (not shown) instead of the display panel 10.

The data driving circuit 21 may be mounted on the display panel 10 using a chip on glass (COG) scheme, a chip on plastic (COP) scheme, or an ultrasonic bonding scheme, and the timing controller 22 may be mounted on a circuit board.

The scan driving circuit 30 receives the scan control signal SCS from the timing controller 22. The scan driving circuit 30 generates scan signals according to the scan control signal SCS and supplies them to the scan lines S1 to Sn of the display panel 10. The scan driving circuit 30 may include a plurality of transistors and be formed in the non-display area NDA of the display panel 10. Alternatively, the scan driving circuit 30 may be formed as an integrated circuit, and in this case, it may be mounted on a gate flexible film attached to the other side of the display panel 10.

The circuit board may be attached to pads provided on one edge of the display panel 10 using an anisotropic conductive film. For this reason, the lead lines of the circuit board may be electrically connected to the pads. The circuit board may be a flexible printed circuit board, a printed circuit board, or a flexible film such as a chip on film. The circuit board may be bent under the display panel 10. Accordingly, one side of the circuit board may be attached to one edge of the display panel 10 and the other side may be disposed below the display panel 10 and connected to a system board on which a host system is mounted.

The power supply circuit 50 may generate voltages necessary for driving the display panel 10 from the main power supplied from the system board and supply the voltages to the display panel 10. For example, the power supply circuit 50 generates a high potential voltage VDD and a low potential voltage VSS for driving the light emitting devices LD of the display panel 10 from the main power supply to supply them to the high potential voltage line VDDL and the low potential voltage line VSSL. Also, the power supply circuit 50 may generate and supply driving voltages for driving the driving circuit 20 and the scan driving circuit 30 from the main power.

FIG. 3 is a plan view showing the display panel of FIG. 1 in detail. In FIG. 3, for convenience of description, data pads (DP1 to $DP_p$, where p is an integer greater than or equal to 2), floating pads FD1 and FD2, power pads PP1 and PP2, floating lines FL1 and FL2, low potential voltage line VSSL, data lines D1 to Dm, first electrodes 260 and second electrodes 220 are shown.

Referring to FIG. 3, the data lines D1 to Dm, the first electrodes 210, the second electrodes 220, and the pixels PX may be disposed in the display area DA of the display panel 10.

The data lines D1 to Dm may extend long in the second direction (Y-axis direction). One sides of the data lines D1 to Dm may be connected to the driving circuit 20. For this reason, the data voltages of the driving circuit 20 may be applied to the data lines D1 to Dm.

The first electrodes 210 may be spaced apart from each other at predetermined intervals in the first direction (X-axis direction). For this reason, the first electrodes 210 may not overlap the data lines D1 to Dm. Among the first electrodes 210, the first electrodes 210 disposed on the right edge of the display area DA may be connected to the first floating line FL1 in the non-display area NDA. Among the first electrodes 210, the first electrodes 210 disposed at the left edge of the display area DA may be connected to the second floating line FL2 in the non-display area NDA.

Each of the second electrodes 220 may extend long in the first direction (X-axis direction). For this reason, the second electrodes 220 may overlap the data lines D1 to Dm. Also, the second electrodes 220 may be connected to the low potential voltage line VSSL in the non-display area NDA. For this reason, the low potential voltage of the low potential voltage line VSSL may be applied to the second electrodes 220.

Figure 4:
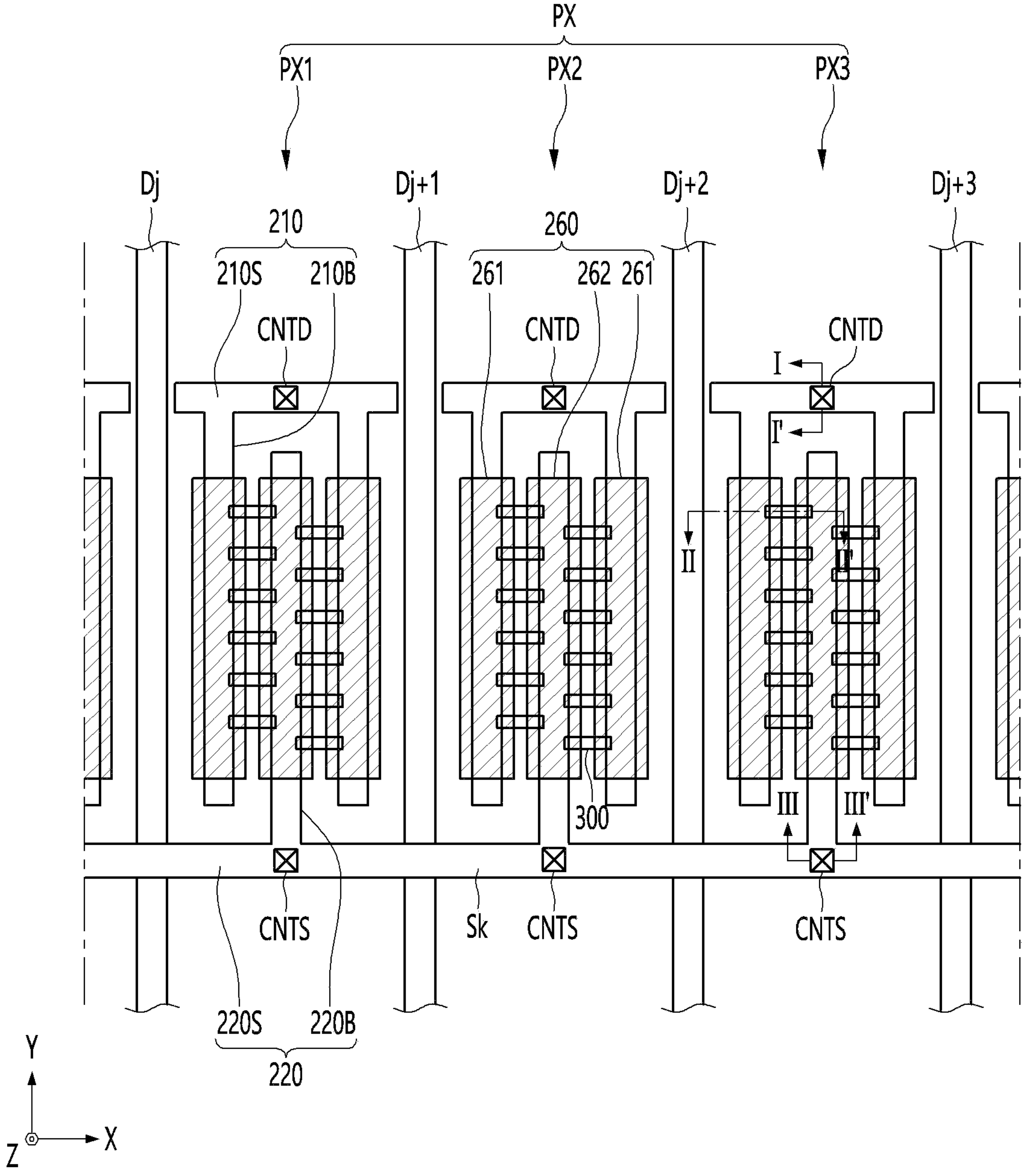
FIG. 4 is a plan view showing a pixel of the display area of FIG. 3 in detail.

Each of the pixels PX may comprise a first sub-pixel PX1, a second sub-pixel PX2, and a third sub-pixel PX3. The first sub-pixel PX1, the second sub-pixel PX2, and the third sub-pixel PX3 of each of the pixels PX may be arranged in regions defined in a matrix form by the first electrodes 210, the second electrodes 220, and data lines D1 to Dm. Although FIG. 4 illustrates that the pixel PX comprises three sub-pixels, it is not limited thereto, and each of the pixels PX may comprise four or more sub-pixels.

The first sub-pixel PX1, the second sub-pixel PX2, and the third sub-pixel PX3 of each of the pixels PX may be disposed in the first direction (X-axis direction), but are not limited thereto. That is, the first sub-pixel PX1, the second sub-pixel PX2, and the third sub-pixel PX3 of each of the pixels PX are disposed in the second direction (Y-axis direction) or in a zigzag shape and may be arranged in a variety of other forms.

The first sub-pixel PX1 may emit a first color light, the second sub-pixel PX2 may emit a second color light, and the third sub-pixel PX3 may emit a third color light. The first color light may be red light, the second color light may be green light, and the third color light may be blue light, but are not limited thereto.

In the non-display area NDA of the display panel 10, a pad part PA including data pads DP1 to $DP_p$, floating pads FD1 and FD2, and power pads PP1 and PP2, and a driving circuit 20, a first floating line FL1, a second floating line FL2, and a low potential voltage line VSSL may be disposed.

The pad part PA including the data pads DP1 to $DP_p$, the floating pads FD1 and FD2, and the power pads PP1 and PP2 may be disposed in one edge of the display panel 10, for example, an edge of the lower side. The data pads DP1 to $DP_p$, the floating pads FD1 and FD2, and the power pads PP1 and PP2 may be disposed side by side in the first direction (X-axis direction) of the pad part PA.

A circuit board may be attached using an anisotropic conductive film on the data pads DP1 to $DP_p$, the floating pads FD1 and FD2, and the power pads PP1 and PP2. Accordingly, the circuit board, the data pads DP1 to $DP_p$, the floating pads FD1 and FD2, and the power pads PP1 and PP2 may be electrically connected.

The driving circuit 20 may be connected to the data pads DP1 to $DP_p$ through the link lines LL. The driving circuit 20 may receive digital video data DATA and timing signals through the data pads DP1 to $DP_p$. The driving circuit 20 may convert the digital video data DATA into analog data voltages and supply them to the data lines D1 to Dm of the display panel 10.

The low potential voltage line VSSL may be connected to the first power pad PP1 and the second power pad PP2 of the pad part PA. The low potential voltage line VSSL may extend long in the second direction (Y-axis direction) in the non-display area NDA located in the left outside and the right outside of the display area DA. The low potential voltage line VSSL may be connected to the second electrode 220. For this reason, the low potential voltage of the power supply circuit 50 is applied to the second electrode 220 through the circuit board, the first power pad PP1, the second power pad PP2 and the low potential voltage line VSSL.

The first floating line FL1 may be connected to the first floating pad FD1 of the pad part PA. The first floating line FL1 may extend long in the second direction (Y-axis direction) in the non-display area NDA located in the left outside and the right outside of the display area DA.

The first floating pad FD1 and the first floating line FL1 may be dummy pads or dummy lines to which no voltage is applied.

The second floating line FL2 may be connected to the second floating pad FD2 of the pad part PA. The first floating line FL1 may extend long in the second direction (Y-axis direction) in the non-display area NDA located in the left outside and the right outside of the display area DA.

The second floating pad FD2 and the second floating line FL2 may be dummy pads or dummy lines to which no voltage is applied.

Meanwhile, since the light emitting devices (300 in FIG. 4) have a very small size, it is difficult that they are mounted on the first sub-pixel PX1, the second sub-pixel PX2, and the third sub-pixel PX3 of each of the pixels PX.

In order to solve this problem, an alignment method using a dielectrophoresis scheme has been proposed.

That is, an electric field may be formed in each of the first sub-pixel PX1, the second sub-pixel PX2, and the third sub-pixel PX3 of the pixels PX to align the light emitting devices 300 during the manufacturing process. Specifically, the light emitting devices 300 may be aligned by applying a dielectrophoretic force to the light emitting devices 300 using a dielectrophoresis scheme during a manufacturing process.

However, during the manufacturing process, it is difficult to apply a ground voltage to the first electrodes 210 by driving the thin film transistors.

Therefore, in the manufactured display device, the first electrodes 210 may be spaced apart at predetermined intervals in a first direction (X-axis direction), but during the manufacturing process, the first electrodes 210 may be not disconnected in a first direction (X-axis direction) and n be extended and may be disposed to extend long.

For this reason, the first electrodes 210 may be connected to the first floating line FL1 and the second floating line FL2 during the manufacturing process. Therefore, the first electrodes 210 may receive a ground voltage through the first floating line FL1 and the second floating line FL2. Accordingly, by disconnecting the first electrodes 210 after aligning the light emitting devices 300 using a dielectrophoresis scheme during the manufacturing process, the first electrodes 210 may be spaced apart at predetermined intervals in the first direction (X-axis direction).

Meanwhile, the first floating line FL1 and the second floating line FL2 are lines for applying a ground voltage during a manufacturing process, and no voltage may be applied in the manufactured display device. Alternatively, the ground voltage may be applied to the first floating line FL1 and the second floating line FL2 to prevent static electricity in the manufactured display device.

FIG. 4 is a plan view showing a pixel of the display area of FIG. 3 in detail.

Referring to FIG. 4, the pixel PX may comprise a first sub-pixel PX1, a second sub-pixel PX2, and a third sub-pixel PX3. The first sub-pixel PX1, the second sub-pixel PX2, and the third sub-pixel PX3 of each of the pixels PX may be arranged in a matrix form in regions defined by the intersection structure of the scan lines Sk and the data lines Dj, Dj+1, Dj+2, and Dj+3.

The scan lines Sk may extend long in a first direction (X-axis direction), and the data lines Dj, Dj+1, Dj+2, and Dj+3 may extend long in the second direction (Y-axis direction) crossing the first direction (X-axis direction).

Each of the first sub-pixel PX1, the second sub-pixel PX2, and the third sub-pixel PX3 may comprise a first electrode 210, a second electrode 220, and a plurality of light emitting devices 300. The first electrode 210 and the second electrode 220 may be electrically connected to the light emitting devices 300 and may receive voltages to emit light of the light emitting device 300.

The first electrode 210 of any one sub-pixel among the first sub-pixel PX1, the second sub-pixel PX2, and the third sub-pixel PX3 may be spaced apart from the first electrode 210 of sub-pixel adjacent to the one sub-pixel. For example, the first electrode 210 of the first sub-pixel PX1 may be spaced apart from the first electrode 210 of the second sub-pixel PX2 adjacent thereto. Also, the first electrode 210 of the second sub-pixel PX2 may be spaced apart from the first electrode 210 of the third sub-pixel PX3 adjacent thereto. Also, the first electrode 210 of the third sub-pixel PX3 may be spaced apart from the first electrode 210 of the first sub-pixel PX1 adjacent thereto.

In contrast, the second electrode 220 of any one sub-pixel among the first sub-pixel PX1, the second sub-pixel PX2, and the third sub-pixel PX3 may be connected to the second electrode 220 of sub-pixel adjacent to the one sub-pixel. For example, the second electrode 220 of the first sub-pixel PX1 may be connected to the second electrode 210 of the adjacent second sub-pixel PX2. Also, the second electrode 220 of the second sub-pixel PX2 may be connected to the second electrode 220 of the third sub-pixel PX3 adjacent thereto. Also, the second electrode 220 of the third sub-pixel PX3 may be connected to the second electrode 220 of the first sub-pixel PX1 adjacent thereto.

In addition, during the manufacturing process, the first electrode 210 and the second electrode 220 may be used to form an electric field in each of the first sub-pixel PX1, the second sub-pixel PX2, and the third sub-pixel PX3 to align the light emitting device 300. Specifically, the light emitting devices 300 may be aligned by applying a dielectrophoresis force to the light emitting devices 300 using a dielectrophoresis scheme during the manufacturing process. An electric field is formed by the voltage applied to the first electrode 210 and the second electrode 220, and a dielectrophoretic force is formed by the electric field such that the dielectrophoretic force can be applied to the light emitting device 300.

The first electrode 210 is an anode electrode connected to the second conductive semiconductor layer of the light emitting devices 300, and the second electrode 220 is a cathode electrode connected to the first conductive semiconductor layer of the light emitting devices 300. The first conductive semiconductor layer of the light emitting devices 300 may be an n-type semiconductor layer, and the second conductive semiconductor layer may be a p-type semiconductor layer. However, the present invention is not limited thereto, and the first electrode 210 may be a cathode electrode and the second electrode 220 may be an anode electrode.

The first electrode 210 may include a first electrode stem 210S extending long in a first direction (X-axis direction) and at least one first electrode branch 210B branching from the first electrode stem 210S in a second direction (Y-axis direction). The second electrode 220 may include a second electrode stem 220S extending long in a first direction (X-axis direction) and at least one second electrode branch 220B branching from the second electrode stem 220S in a second direction (Y-axis direction).

The first electrode stem 210S may be electrically connected to the thin film transistor 120 through the first electrode contact hole CNTD.

For this reason, the first electrode stem 210S may receive a predetermined driving voltage through the thin film transistor 120. The thin film transistor 120 to which the first electrode stem 210S is connected may be the driving transistor DT shown in FIG. 2.

The second electrode stem 220S may be electrically connected to the low potential auxiliary line 161 through the second electrode contact hole CNTS.

Accordingly, the second electrode stem 220S may receive a low potential voltage of the low potential auxiliary line 161. In FIG. 4, the second electrode stem 220S may be connected to the low potential auxiliary line 161 through the second electrode contact hole CNTS in each of the first sub-pixel PX1, the second sub-pixel PX2, and the third sub-pixel PX3 of the pixel PX, but the present invention is not limited thereto. For example, the second electrode stem 220S may be connected to the low potential auxiliary line 161 through the electrode contact hole CNTS in any one of the first sub-pixel PX1, the second sub-pixel PX2, and the third sub-pixel PX3 of the pixel PX. Alternatively, as shown in FIG. 3, since the second electrode stem 220S is connected to the low potential voltage line VSSL of the non-display area NDA, it may not be connected to the low potential auxiliary line 161. That is, the second electrode contact hole CNTS may be omitted.

The first electrode stem 210S of one sub-pixel may be disposed parallel to the first electrode stem 210S of sub-pixel adjacent to the one sub-pixel in a first direction (X-axis direction) in a first direction (X-axis direction). For example, the first electrode stem 210S of the first sub-pixel PX1 is disposed parallel to the first electrode stem 210S of the second sub-pixel PX2 in the first direction (X-axis direction). The first electrode stem 210S of the second sub-pixel PX2 is disposed parallel to the first electrode stem 210S of the third sub-pixel PX3 in the first direction (X-axis direction). The first electrode stem 210S of the third sub-pixel PX3 may be disposed parallel to the first electrode stem 210S of the first sub-pixel PX1 in the first direction (X-axis direction). This is because the first electrode stems 210S were connected as one during the manufacturing process, and then disconnected through a laser process after the light emitting devices 300 were aligned.

The second electrode branch 220B may be disposed between the first electrode branch 210B. The first electrode branches 210B may be symmetrically disposed with respect to the second electrode branches 220B. In FIG. 4, each of the first sub-pixel PX1, the second sub-pixel PX2, and the third sub-pixel PX3 of the pixel PX includes two first electrode branches 220B, but the present invention is not limited thereto. For example, each of the first sub-pixel PX1, the second sub-pixel PX2, and the third sub-pixel PX3 of the pixel PX may include three or more first electrode branches 220B.

In addition, in FIG. 4, each of the first sub-pixel PX1, the second sub-pixel PX2, and the third sub-pixel PX3 of the pixel PX includes one second electrode branch 220B, but the present invention is not limited thereto. For example, when each of the first sub-pixel PXT, the second sub-pixel PX2, and the third sub-pixel PX3 of the pixel PX includes a plurality of second electrode branches 220B, the first electrode branch 210B may be disposed between the second electrode branch 220B. That is, in each of the first sub-pixel PX1, the second sub-pixel PX2, and the third sub-pixel PX3 of the pixel PX, the first electrode branch 210B, the second electrode branch 220B, the first electrode branch 210B and the second electrode branch 220B may be sequentially arranged in the first direction (X-axis direction).

The plurality of light emitting devices 300 may be disposed between the first electrode branch 210B and the second electrode branch 220B. One end of at least one light emitting device 300 among the plurality of light emitting devices 300 is disposed to overlap the first electrode branch 210B, and the other end is disposed to overlap the second electrode branch 220B. A second conductive semiconductor layer, which is a p-type semiconductor layer, may be disposed at one end of each of the plurality of light emitting devices 300, and a first conductive semiconductor layer, which is an n-type semiconductor layer, may be disposed at the other end, but is not limited thereto. For example, a first conductive semiconductor layer, which is an n-type semiconductor layer, may be disposed at one end of the plurality of light emitting devices 300, and a second conductive semiconductor layer, which is a p-type semiconductor layer, may be disposed at the other end.

The plurality of light emitting devices 300 may be disposed substantially side by side in the first direction (X-axis direction). The plurality of light emitting devices 300 may be spaced apart from each other in the second direction (Y-axis direction). In this case, the spacing interval between the plurality of light emitting devices 300 may be different from each other. For example, some of the plurality of light emitting devices 300 may be adjacently disposed to form one group, and the remaining light emitting devices 300 may be adjacently disposed to form another group.

A connection electrode 260 may be disposed on the first electrode branch 210B and the second electrode branch 220B, respectively. The connection electrodes 260 may be disposed to extend long in the second direction (Y-axis direction) and spaced apart from each other in the first direction (X-axis direction). The connection electrode 260 may be connected to one end of at least one light emitting device 300 among the light emitting devices 300. The connection electrode 260 may be connected to the first electrode 210 or the second electrode 220.

The connection electrode 260 may include a first connection electrode 261 disposed on the first electrode branch 210B and connected to one end of at least one light emitting device 300 of the light emitting devices 300, and a second connection electrode 262 disposed on the branch portion 220B and connected to one end of at least one light emitting device 300 of the light emitting devices 300. For this reason, the first connection electrode 261 serves to electrically connect the plurality of light emitting devices 300 to the first electrode 210, and the second connection electrode 262 serves to electrically connect the plurality of light emitting devices 300 to the second electrode 220.

A width of the first connection electrode 261 in the first direction (X-axis direction) may be greater than a width of the first electrode branch 210B in the first direction (X-axis direction). Also, the width of the second connection electrode 262 in the first direction (X-axis direction) may be greater than the width of the second electrode branch 220B in the first direction (X-axis direction).

For example, each end of the light emitting devices 300 is disposed on the first electrode branch 210B of the first electrode 210 and the second electrode branch 220B of the second electrode 220, but due to an insulating layer (not shown) formed on the first electrode 210 and the second electrode 220, the light emitting device 300 may not be electrically connected to the first electrode 210 and the second electrode 220. Accordingly, portions of a side surface and/or an upper surface of the light emitting device 300 may be electrically connected to the first connection electrode 261 and the second connection electrode 262, respectively.

Meanwhile, the display device according to the embodiment uses a light emitting device as a light source. The light emitting device of the embodiment is a self-light emitting device that emits light by itself when electricity is applied, and may be a semiconductor light emitting device. Since the light emitting device of the embodiment is made of an inorganic semiconductor material, it is resistant to deterioration and has a semi-permanent lifespan such that it can contribute to realizing high-quality and high-definition image in a display device by providing stable light.

Figure 5:
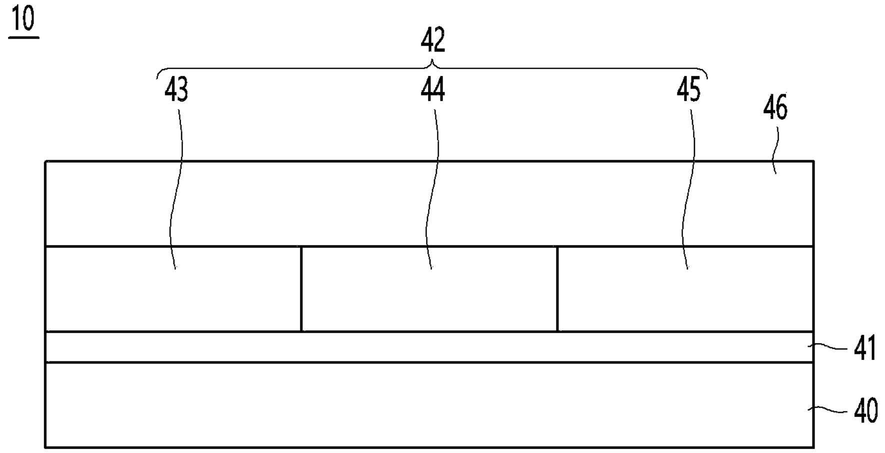
FIG. 5 is a schematic cross-sectional view of the display panel of FIG. 1.

FIG. 5 is a schematic cross-sectional view of the display panel of FIG. 1.

Referring to FIG. 5, the display panel 10 of the embodiment may comprise a first substrate 40, a light emitting unit 41, a color generating unit 42 and a second substrate 46. The display panel 10 of the embodiment may include more elements than these, but is not limited thereto.

Although not shown, at least one or more insulating layers between the first substrate 40 and the light emitting unit 41, between the light emitting unit 41 and the color generating unit 42, and/or between the color generating unit 42 and the second substrate 46, but is not limited thereto.

The first substrate 40 may support the light emitting unit 41, the color generating unit 42, and the second substrate 46. The second substrate 46 may comprise various elements as described above. For example, the second substrate 46 may comprise the data lines (D1 to Dm, where m is an integer greater than or equal to 2), the scan lines S1 to Sn, the high potential voltage line VDDL and the low potential voltage line VSSL, a plurality of transistors and at least one capacitor as shown in FIG. 2, and a first electrode 210 and a second electrode 220 as shown in FIG. 3.

The first substrate 40 may be formed of glass, but is not limited thereto.

The light emitting unit 41 may provide light to the color generating unit 42. The light emitting unit 41 may include a plurality of light sources that emit light themselves by applying electricity. For example, the light source may include a light emitting device (300 in FIG. 4).

As an example, the plurality of light emitting devices 300 are disposed separately for each sub-pixel of a pixel, and may independently emit light by controlling each sub-pixel.

As another example, the plurality of light emitting devices 300 may be arranged regardless of pixel division and simultaneously emit light from all sub-pixels.

The light emitting device 300 of the embodiment may emit blue light, but is not limited thereto. For example, the light emitting device 300 of the embodiment may emit white light or purple light.

The color generating unit 42 may generate of a different color light from the light provided by the light emitting unit 41.

For example, the color generating unit 42 may include a first color generator 43, a second color generator 44, and a third color generator 45. The first color generator 43 may correspond to the first sub-pixel PX1 of the pixel, the second color generator 44 may correspond to the second sub-pixel PX2 of the pixel, and the third color generator 45 may correspond to the third sub-pixel PX3 of the pixel.

The first color generator 43 may generate first color light based on the light provided from the light emitting unit 41, and the second color generator 44 may generate second color light based on the light provided from the light emitting unit 41, and the third color generator 45 may generate third color light based on light provided from the light emitting unit 41. For example, the first color generator 43 may output blue light from the light emitting unit 41 as red light, and the second color generator 44 may output blue light from the light emitting unit 41 as green light, and the third color generator 45 may output blue light from the light emitting unit 41 as it is.

As an example, the first color generator 43 may include a first color filter, the second color generator 44 may include a second color filter, and the third color generator 45 may include a third color filter.

The first color filter, the second color filter, and the third color filter may be formed of a transparent material through which light can pass.

For example, at least one of the first color filter, the second color filter, and the third color filter may include a quantum dot.

The quantum dot of the embodiment may be selected from a group II-IV compound, a group IV-VI compound, a group IV element, a group IV compound, and a combination thereof.

The group II-VI compound may be selected the groups consisting of a binary compound selected from the group consisting of CdSe, CdTe, ZnS, ZnSe, ZnTe, ZnO, HgS, HgSe, HgTe, MgSe, MgS, and mixtures thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof; and quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and mixtures thereof.

The group III-V compound may be selected the groups consisting of a binary compound selected from the group consisting of GaN, GaP, GaAs, GaSb, AlN, AlP, AlAs, AlSb, InN, InP, InAs, InSb and mixtures thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and mixtures thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and mixtures thereof.

The group IV-VI compound may be selected the groups consisting of a binary compound selected from the group consisting of SnS, SnSe, SnTe, PbS, PbSe, PbTe, and mixtures thereof; a ternary compound selected from the group consisting of SnSeS, SnSeTe, SnSTe, PbSeS, PbSeTe, PbSTe, SnPbS, SnPbSe, SnPbTe, and mixtures thereof; and a quaternary compound selected from the group consisting of SnPbSSe, SnPbSeTe, SnPbSTe, and mixtures thereof.

The group IV element may be selected from the group consisting of Si, Ge, and mixtures thereof. The group IV compound may be a binary element compound selected from the group consisting of SiC, SiGe, and mixtures thereof.

Such quantum dot may have a full width of half maximum (FWHM) of an emission wavelength spectrum of approximately 45 nm or less, and light emitted through the quantum dot may be emitted in all directions. Accordingly, the viewing angle of the light emitting display device may be improved.

Meanwhile, the quantum dot may have a shape such as spherical, pyramidal, multi-arm, or cubic nanoparticles, nanotubes, nanowires, nanofibers, nanoplatelet particles, etc., but are not limited thereto.

For example, when the light emitting device 300 emits blue light, the first color filter may include red quantum dots, and the second color filter may include green quantum dots. The third color filter may not include quantum dots, but is not limited thereto. For example, blue light from the light emitting device 300 is absorbed by the first color filter, and the wavelength of the absorbed blue light is shifted by red quantum dots to output red light. For example, blue light from the light emitting device 300 is absorbed by the second color filter, and the wavelength of the absorbed blue light is shifted by green quantum dots to output green light. For example, blue light from the light emitting device 300 may be absorbed by the third color filter, and the absorbed blue light may be output as it is.

Meanwhile, when the light emitting device 300 emits white light, not only the first color filter and the second color filter, but also the third color filter may include quantum dots. That is, the wavelength of white light of the light emitting device 300 may be shifted to blue light by the quantum dots included in the third color filter.

For example, at least one of the first color filter, the second color filter, and the third color filter may include a phosphor. For example, some of the first color filter, the second color filter, and the third color filter may include quantum dots, and others may include phosphors. For example, each of the first color filter and the second color filter may include a phosphor and a quantum dot. For example, at least one of the first color filter, the second color filter, and the third color filter may include scattering particles. Since blue light incident on each of the first color filter, the second color filter, and the third color filter is scattered by the scattering particles and the color of the scattered blue light is shifted by the corresponding quantum dots, light output efficiency may be improved.

As another example, the first color generator 43 may include a first color converter and a first color filter. The second color generator 44 may include a second color converter and a second color filter. The third color generator 45 may include a third color converter and a third color filter. Each of the first color converter, the second color converter, and the third color converter may be disposed adjacent to the light emitting unit 41. The first color filter, the second color filter and the third color filter may be disposed adjacent to the second substrate 46.

For example, the first color filter may be disposed between the first color converter and the second substrate 46. For example, the second color filter may be disposed between the second color converter and the second substrate 46. For example, the third color filter may be disposed between the third color converter and the second substrate 46.

For example, the first color filter may contact the upper surface of the first color converter and have the same size as the first color converter, but is not limited thereto. For example, the second color filter may contact the upper surface of the second color converter and have the same size as the second color converter, but is not limited thereto. For example, the third color filter may contact the upper surface of the third color converter and have the same size as the third color converter, but is not limited thereto.

For example, the first color converter may include red quantum dots, and the second color converter may include green quantum dots. The third color converter may not include quantum dots. For example, the first color filter may include a red-based material that selectively transmits the red light converted in the first color converter, and the second color filter may include a green-based material that selectively transmits the green light converted in the second color converter, and the third color filter may include a blue-based material that selectively transmits blue light transmitted as it is through the third color converter.

Meanwhile, when the light emitting device 300 emits white light, the third color converter as well as the first color converter and the second color converter may also include quantum dots. That is, the wavelength of white light of the light emitting device 300 may be shifted to blue light by the quantum dots included in the third color filter.

Referring back to FIG. 5, the second substrate 46 may be disposed on the color generating unit 42 to protect the color generating unit 42. The second substrate 46 may be formed of glass, but is not limited thereto.

The second substrate 46 may be called a cover window, cover glass, or the like.

The second substrate 46 may be formed of glass, but is not limited thereto.

Meanwhile, the embodiment provides an inkjet head device capable of ensuring uniformity of luminance of each sub-pixel on a substrate by making the number of light emitting devices included in each water drop dropped onto the substrate the same or similar.

Hereinafter, various embodiments in which the number of light emitting devices included in each water droplet dropped onto the substrate are the same or similar will be described.

The First Embodiment

Figure 6:
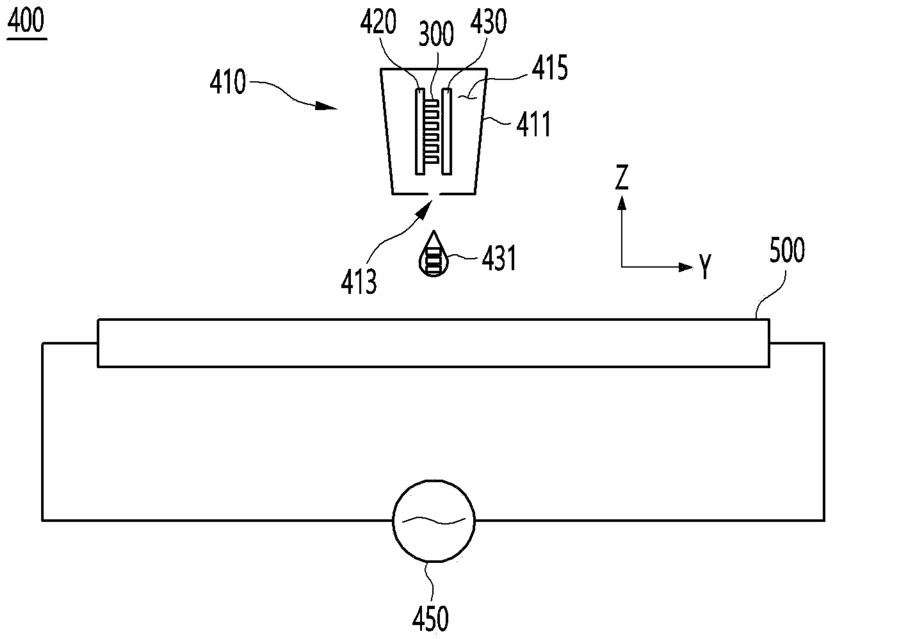
FIG. 6 shows a display manufacturing apparatus according to an embodiment.

FIG. 6 shows a display manufacturing apparatus according to an embodiment.

Referring to FIG. 6, a display manufacturing apparatus 400 according to the embodiment may comprise an inkjet head device 410 and a power supply 450. The display manufacturing apparatus 400 according to the embodiment may comprise more elements than these, but is not limited thereto.

The inkjet head device 410 may be called a dropping unit, an inkjet ejection device, or an ink ejector. The inkjet head device 410 may drop a plurality of light emitting devices 300 onto the substrate 500 in units of droplets 431. For example, the substrate 500 may be the first substrate 40 shown in FIG. 6.

The substrate 500 includes a plurality of sub-pixels (PX1, PX2, and PX3 in FIG. 2), and each sub-pixel (PX1, PX2, and PX3 in FIG. 2) may comprise an emission area and a non-emission area. The emission area may be an area where the light emitting devices 300 are aligned or arranged to emit light, and the non-emission area may be an area including scan lines S1 to Sn, data lines D1 to Dm, and transistors (ST and DT in FIG. 3).

At least one barrier rib may be disposed on the substrate 500. The emission area or the non-emission area may be defined by at least one barrier rib. Alternatively, each of the sub-pixels PX1, PX2, and PX3 may be defined by at least one barrier rib.

The first and second electrodes (210 and 220 in FIG. 4) may be spaced apart from each other on the substrate 500. The first electrode 210 and the second electrode 220 may be connected by the power supply 450. The power supply 450 may apply voltage to the first electrode 210 and the second electrode 220. An electric field may be formed by a voltage applied to the first electrode 210 and the second electrode 220. Electrons or holes of the light emitting device 300 are moved to one side by this electric field, and the light emitting device 300 may be aligned by dielectrophoretic force between the first electrode 210 and the second electrode 220.

Before the light emitting devices 300 are dropped onto the substrate 500 in units of liquid droplets 431 from the inkjet head device 410, voltage from the applied voltage unit 450 is applied to the first electrode 210 and the second electrode 220, but is not limited thereto. For example, the light emitting devices 300 may be dropped onto the substrate 500 in units of droplets 431 from the inkjet head device 410, and the dropped droplets 431 may fill the barrier ribs on the substrate 500. The light emitting devices 300 included in the liquid droplets 431 filled in the corresponding barrier rib may be aligned between the first electrode 210 and the second electrode 220 by the dielectrophoretic force formed.

In the embodiment, the uniformity of luminance of each sub-pixel on the substrate 500 can be secured by making the number of light emitting devices 300 included in the droplet 431 dropped on the substrate 500 the same or similar.

Hereinafter, the inkjet head device 410 will be described in more detail.

The inkjet head device 410 may comprise a body 411, a nozzle 413, and a first guide part 420.

The body 411 may have an accommodating space 415, the accommodating space 415 may be filled with liquid, and the light emitting devices 300 may be included in the liquid.

The nozzle 413 may be provided at a lower end of the body 411 and communicate with the accommodation space 415 in the body 411. The light emitting devices 300 in the body 411 may be dropped on the substrate 500 through the nozzle 413 in units of droplets 431. Since the liquid filled in the body 411 has viscosity, the liquid with viscosity may be sprayed through the nozzle 413 in units of droplets 431.

The first guide part 420 may be disposed in the body 411 to guide the light emitting devices 300 to the nozzle 413 in a line.

For example, the light emitting devices 300 may stick to the first guide part 420. To this end, the first guide part 420 may include, for example, a permanent magnet or an electromagnet, but is not limited thereto. The light emitting devices 300 may be sticked to permanent magnets or electromagnets.

Figure 31:
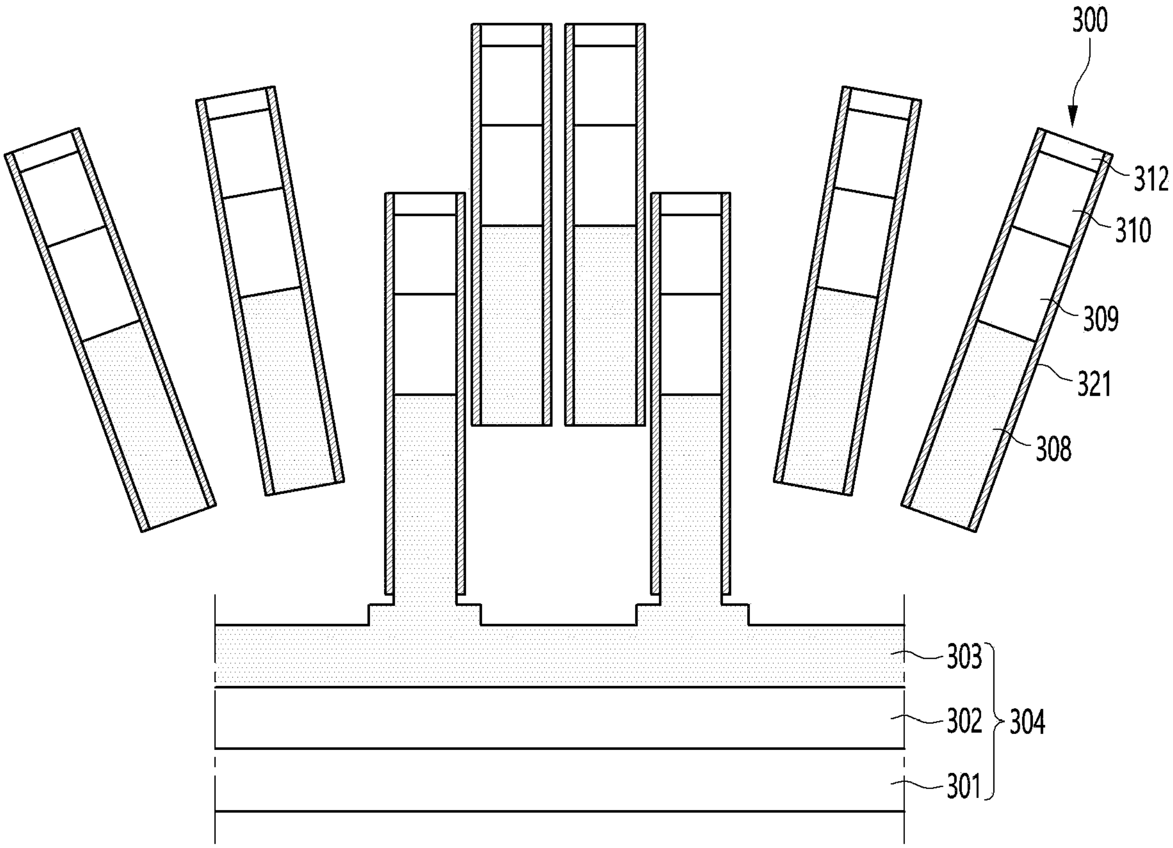
Figure 32:
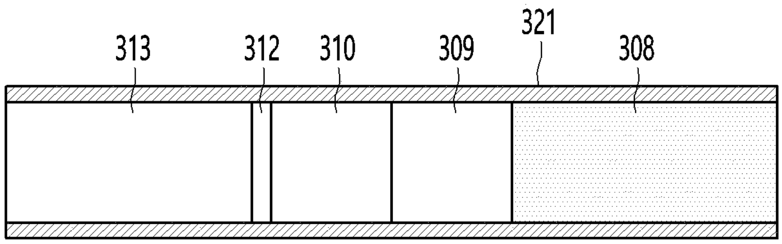
FIG. 32 is a cross-sectional view showing a light emitting device according to the second embodiment.

For example, each of the light emitting devices 300 may comprise at least one magnetic layer (312 in FIGS. 31 and 32). Due to the magnetic layer 312 of each of the light emitting devices 300, each of the light emitting devices 300 may stick to the permanent magnet or electromagnet of the first guide part 420. For example, each of the magnetic layers 312 of each of the light emitting devices 300 may be magnetized by a permanent magnet or an electromagnet to stick each of the light emitting devices 300 to the permanent magnet or the electromagnet.

For example, the magnetic layer 312 may be disposed at least one end of the light emitting device 300. Accordingly, one surface of the magnetic layer 312 of the light emitting device 300 may be sticked face to face to one surface of the permanent magnet or electromagnet. Accordingly, the light emitting device 300 may be disposed long in a vertical direction with respect to one surface of the permanent magnet or electromagnet.

When the first guide part 420 includes an electromagnet, the light emitting device 300 may be sticked to or detached from the electromagnet according to supply or blocking of current applied to the electromagnet. For example, when a current flows through a coil wound around an electromagnet, magnetic force may be formed in the electromagnet by the current. The light emitting devices 300 may stick to the electromagnet due to the magnetic force of the electromagnet. For example, when supply of current to a corresponding coil is blocked while the light emitting device 300 is sticked to the electromagnet, magnetic force is no longer formed on the electromagnet such that the light emitting device 300 may be detached from the electromagnet.

For example, when the light emitting devices 300 are put into the body 411, the corresponding light emitting devices 300 may be freely disposed in a random direction. Thereafter, the light emitting devices 300 may be arranged in a line by current flowing through a coil wound around the electromagnet. Thereafter, when the supply of current to the electromagnet is blocked, the light emitting devices 300 sticked to the electromagnet in a line are detached from the electromagnet and at the same time the corresponding light emitting devices 300 may be dropped on the substrate 500 through the nozzle 413 in units of droplets 431.

Figure 7:
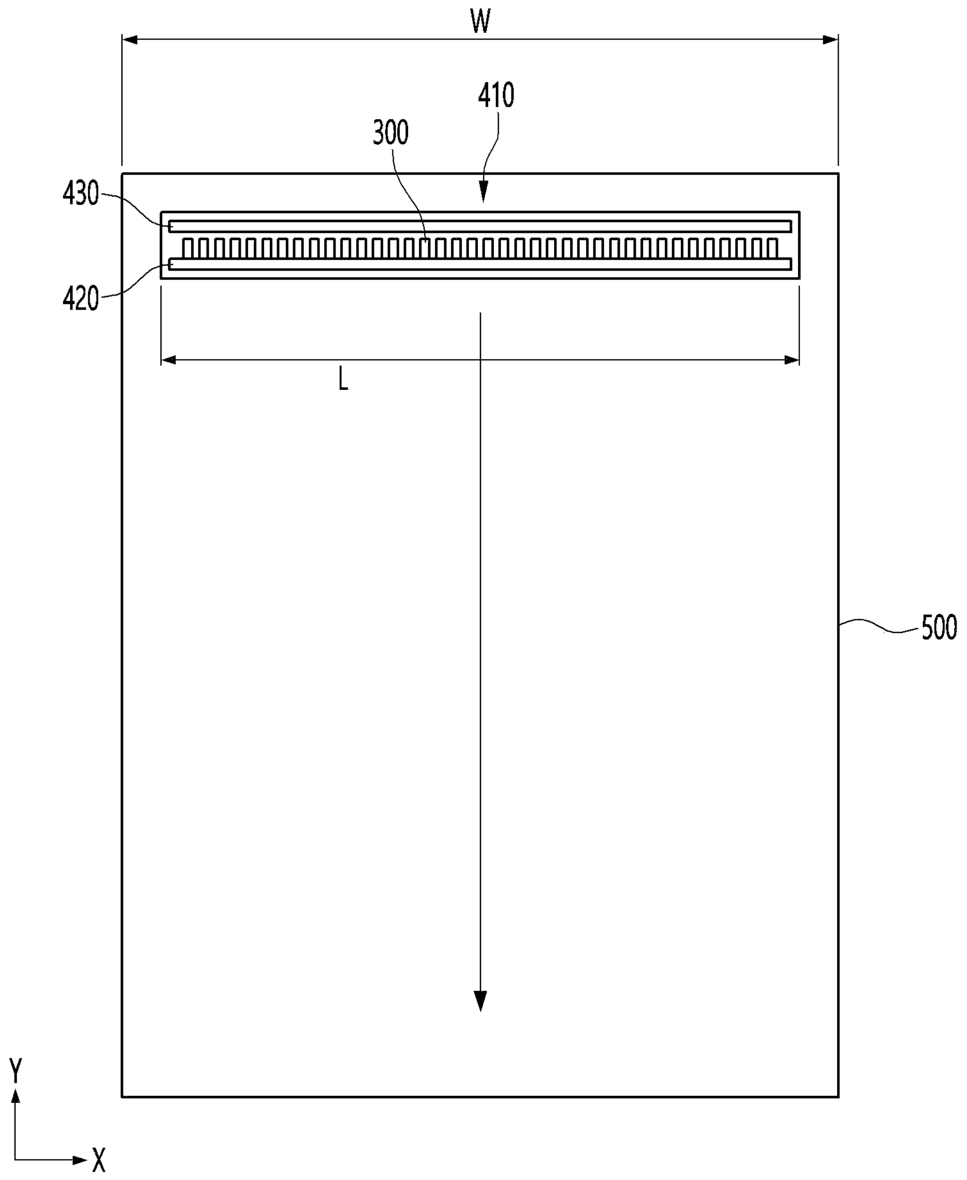
FIG. 7 shows a usage aspect of a single inkjet head device.

As shown in FIG. 7, a single inkjet head device 410 may be provided. The long axis of the inkjet head device 410 may be located along the X-axis direction. In this case, the length L of the long axis direction of the inkjet head device 410 may be equal to or smaller than the width W of the substrate 500. At least one of the inkjet head device 410 and the substrate 500 may be moved in one direction, that is, along the Y-axis direction. When the substrate 500 is placed on the stage, the substrate 500 may be moved by moving the stage in the Y-axis direction. For example, while the inkjet head device 410 or the substrate 500 moves along the Y-axis direction, the light emitting devices 300 from the inkjet head device 410 may be dropped onto the substrate 500 in units of droplets 431. For example, by reciprocating the inkjet head device 410 or the substrate 500 a predetermined number of times along the Y-axis direction, each sub-pixel on the substrate 500 may be filled with a desired amount of droplets. In this case, the amount of droplets filled in each sub-pixel may be the same or similar, and the number of light emitting devices 300 included in the amount of droplets may also be the same or similar.

Figure 8:
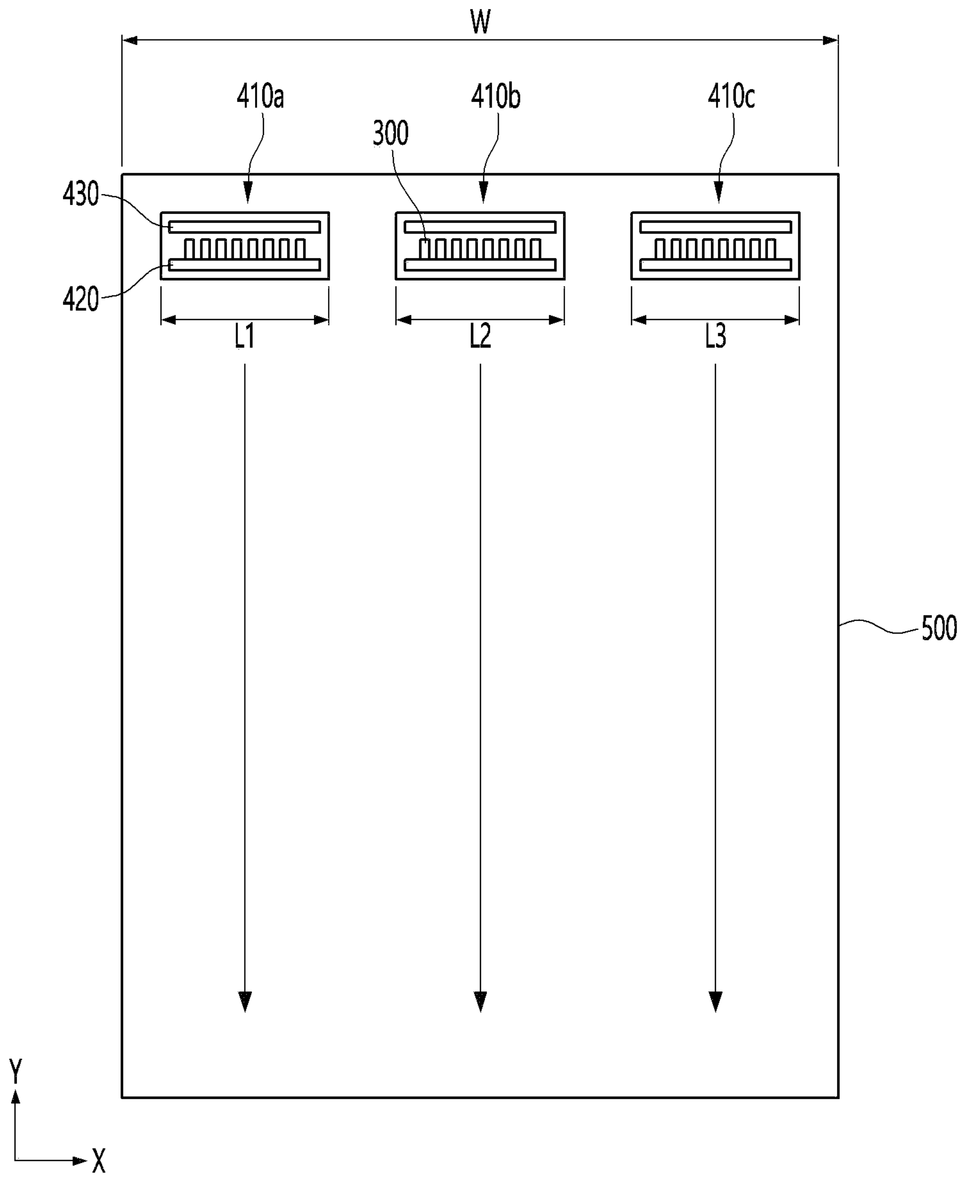
FIG. 8 shows a usage aspect of a plurality of inkjet head devices.

As shown in FIG. 8, the inkjet head device 410 may comprise a plurality of inkjet head devices 410*a*, 410*b*, and 410*c*. A long axis of each of the plurality of inkjet head devices 410*a*, 410*b*, and 410*c* may be positioned along the X-axis direction. In this case, the plurality of inkjet head devices 410*a*, 410*b*, and 410*c* may be disposed adjacent to each other along the X-axis direction. For example, the plurality of inkjet head devices 410*a*, 410*b*, and 410*c* may contact each other along the X-axis direction. In this case, the sum L1, L2 and L3 of the lengths of each of the plurality of inkjet head devices 410*a*, 410*b*, and 410*c* in the long axis direction may be equal to or smaller than the width W of the substrate 500. At least one of the plurality of inkjet head devices 410*a*, 410*b*, and 410*c* or the substrate 500 may be moved along the Y-axis direction. The plurality of inkjet head devices 410*a*, 410*b*, and 410*c* may simultaneously move along the Y-axis direction, but is not limited thereto.

When the substrate 500 is placed on the stage, the substrate 500 may be moved by moving the stage along the Y-axis direction. For example, while the plurality of inkjet head devices 410*a*, 410*b*, and 410*c* or the substrate 500 moves along the Y-axis direction, the light emitting devices 300 may be dropped onto the substrate 500 in units of droplets 431 from each of the plurality of inkjet head devices 410*a*, 410*b*, and 410*c*. For example, by reciprocating the plurality of inkjet head devices 410*a*, 410*b*, and 410*c* or the substrate 500 along the Y-axis direction a predetermined number of times, each sub-pixel on the substrate 500 may be filled with a desired amount of droplets. In this case, the amount of droplets filled in each sub-pixel may be the same or similar, and the number of light emitting devices 300 included in the amount of droplets may also be the same or similar.

According to the embodiment, since the light emitting devices 300 arranged in a line by the first guide part 420 are dropped on the substrate 500 in units of a certain amount of droplets 431, the number of light emitting devices 300 may be the same or similar. Accordingly, the same or similar droplets are filled in each sub-pixel on the substrate 500 with a predetermined number of droplets 431, and the number of light emitting devices 300 included in each droplet 431 is also the same or similar. Since the same or similar number of light emitting devices 300 are disposed or aligned in each sub-pixel, luminance obtained by these light emitting devices 300 in each sub-pixel can be uniform.

According to the embodiment, the light emitting devices 300 aligned in a line by the first guide part 420 may be dropped onto the substrate 500 in units of a certain amount of droplets 431. In particular, the arrangement direction of the light emitting devices 300 arranged in a line within the body 411 of the inkjet head devices 410*a*, 410*b*, and 410*c* coincides with a direction perpendicular to the first electrode and the second electrode on the substrate 500. Accordingly, the light emitting devices 300 arranged in a line in the body 411 of the inkjet head devices 410*a*, 410*b*, and 410*c* are dropped in a direction perpendicular to the first electrode and the second electrode on the substrate 500, these dropped light emitting devices 300 may be aligned between the first electrode and the second electrode as they are due to the dielectrophoretic force between the first electrode and the second electrode. Therefore, the degree of alignment of the light emitting devices 300 in each sub-pixel is improved, thereby remarkably increasing the luminance in each sub-pixel.

Figure 9:
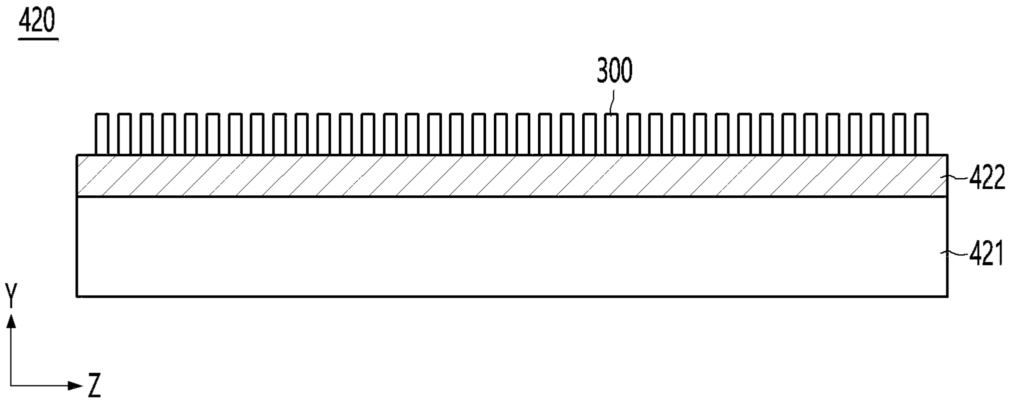
FIG. 9 is a cross-sectional view showing a first guide part according to the first embodiment.

Meanwhile, as shown in FIG. 9, the first guide part 420 may comprise a support substrate 421 and a magnet layer 422.

The support substrate 421 may support the magnet layer 422, and at least one region may be fastened to and fixed to the body 411. Unlike this, the support substrate 421 may be connected to a separate moving means without being fastened to the body 411 and move in one direction, for example, up and down.

The magnet layer 422 may be disposed on one surface of the support substrate 421. For example, the magnet layer 422 may be a permanent magnet or an electromagnet, but is not limited thereto. Since the permanent magnet or electromagnet has been described above, a detailed description will be omitted.

When the magnet layer 422 has sufficient supporting strength, the support substrate 421 may be omitted.

Since each of the light emitting devices 300 includes the magnetic layer 312, as shown in FIG. 9, the light emitting devices 300 may be sticked to the magnet layer 422 in a line.

Figure 10:
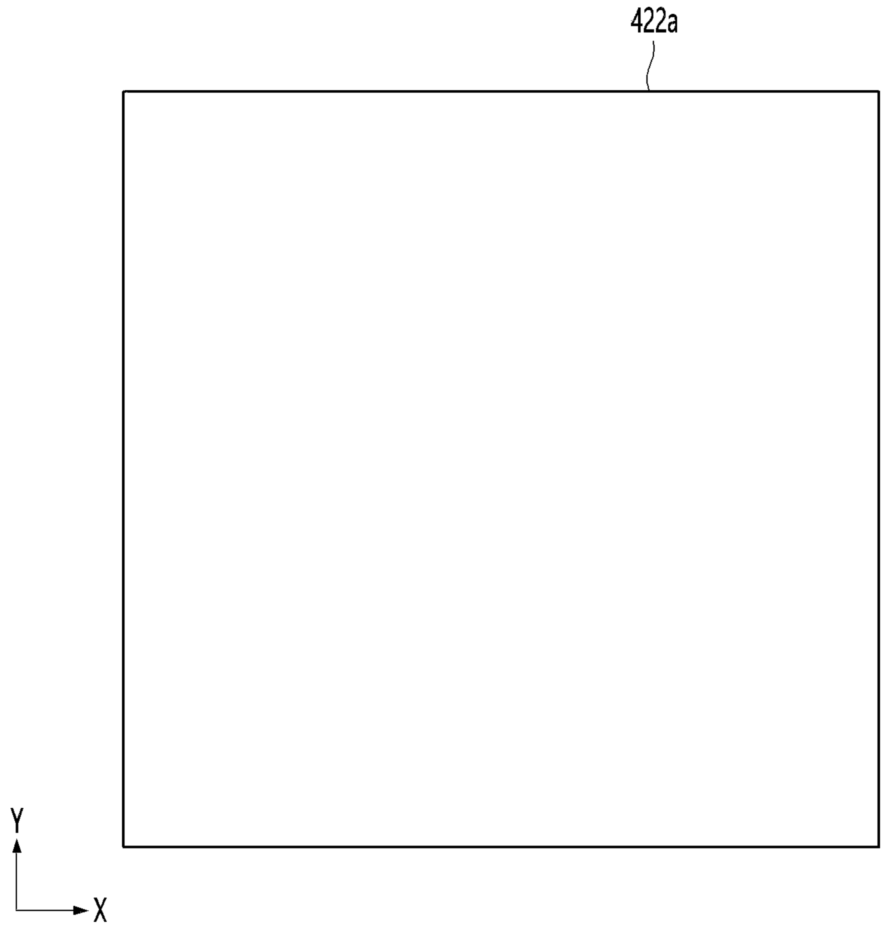
FIG. 10 is a first exemplary view of the shape of the magnet layer.

As a first example, the magnet layer 422 may have a plate shape 422*a* as shown in FIG. 10. For example, the light emitting devices 300 may be evenly sticked to the entire area of the magnet layer 422.

Figure 11:
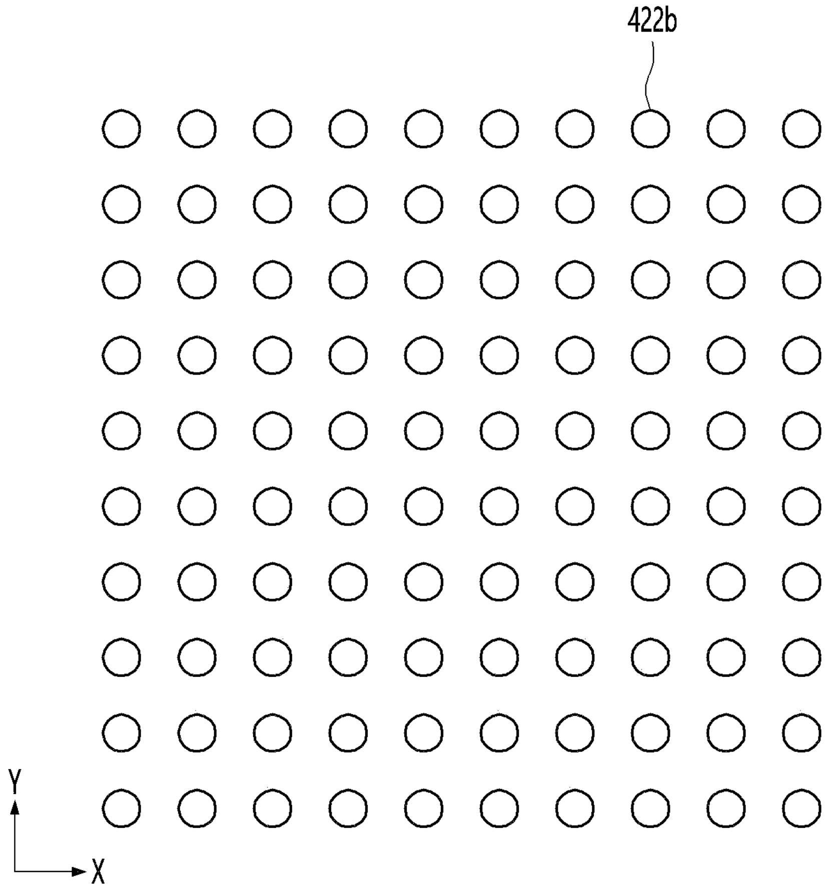
FIG. 11 is a second exemplary view of the shape of the magnet layer.

As a second example, the magnet layer 422 may include a plurality of dots 422*b* arranged in a matrix, as shown in FIG. 11. In the drawing, the dot 422*b* has a circular shape, but the dot 422*b* may have various shapes such as a square shape, an elliptical shape, a polygonal shape, or the like. For example, at least one light emitting device 300 may stick to the dot 422*b*.

In the drawing, the interval between the dots 422*b* is relatively large, but the dots 422*b* may come into contact with each other. When the circular dots 422*b* contact each other, the light emitting device 300 may stick to one surface of the dots 422*b* or may contact the support substrate 421 through a space between adjacent dots 422*b*. That is, the side surface of the magnetic layer 312 of the light emitting device 300 is aligned in the spaced space between the adjacent dots 422*b* by the magnetic force on the side surface of the adjacent dot 422*b*, and one surface of the magnetic layer 312 of the light emitting device 300 may be in surface contact with the support substrate 421.

Figure 12:
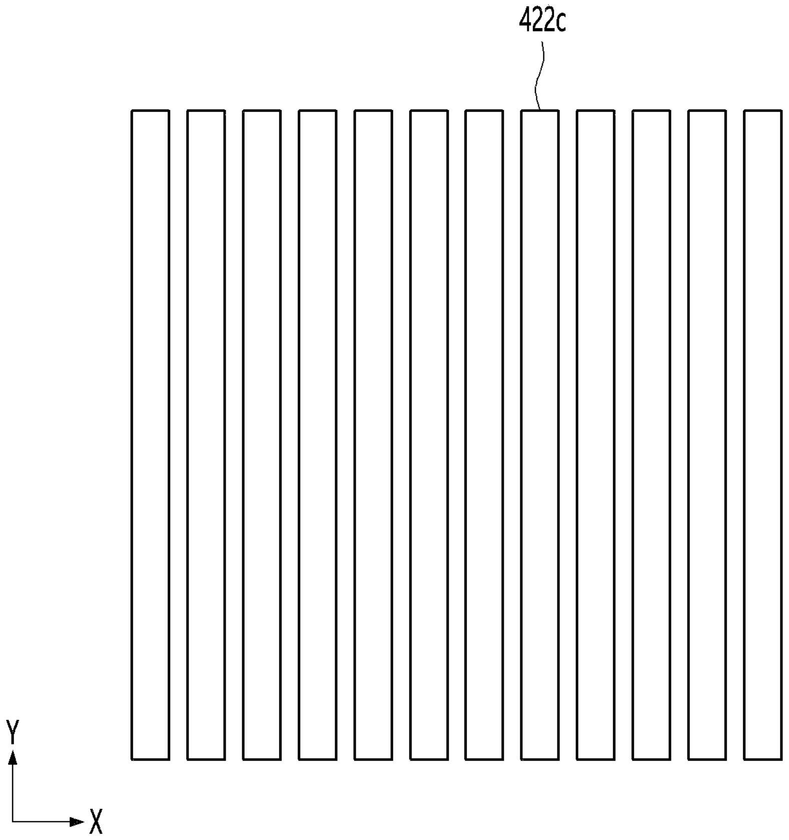
FIG. 12 is a third exemplary view of the shape of the magnet layer.

As a third example, as shown in FIG. 12, the magnet layer 422 may include a plurality of lines 422*c* that are disposed long in the vertical direction, that is, along the Y-axis direction. The plurality of lines 422*c* may be arranged spaced apart from each other in a horizontal direction, that is, along an X-axis direction. Alternatively, the plurality of lines 422*c* may contact each other along the X-axis direction. For example, the light emitting devices 300 may stick to one surface of each of the plurality of lines 422*c* or may contact the support substrate 421 through a space between the plurality of lines 422*c*.

Figure 13:
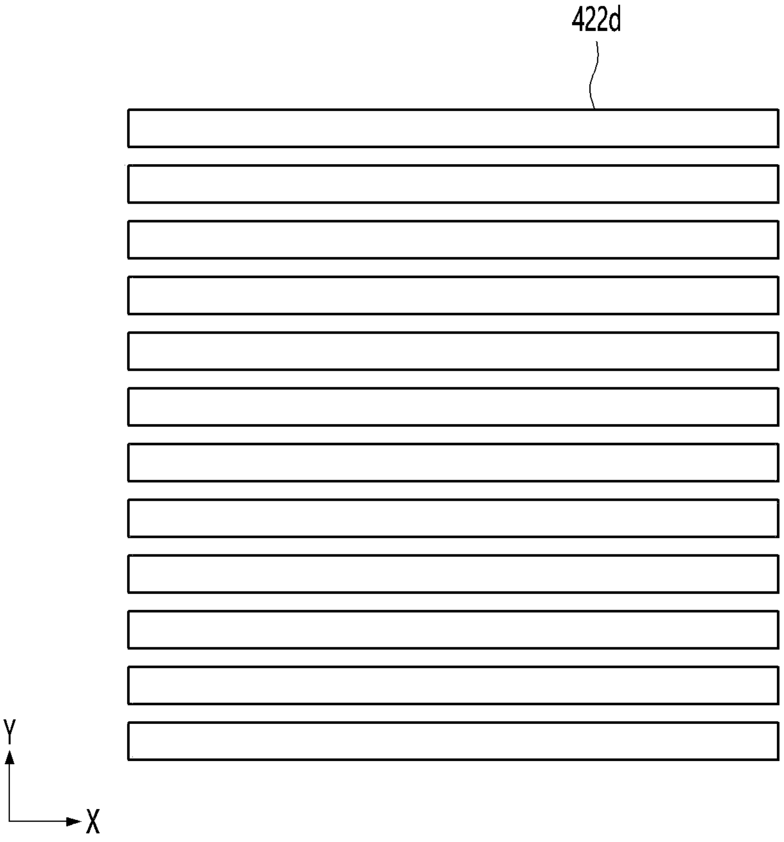
FIG. 13 is a fourth exemplary view of the shape of the magnet layer.

As a fourth example, as shown in FIG. 13, the magnet layer 422 may include a plurality of lines 422*d* that are long disposed in a horizontal direction. The plurality of lines 422*d* may be spaced apart from each other along a vertical direction. Alternatively, the plurality of lines 422*d* may contact each other along the Y-axis. For example, the light emitting devices 300 may stick to one surface of each of the plurality of lines 422*d* or may contact the support substrate 421 through a space between the lines 422*d*.

Figure 14:
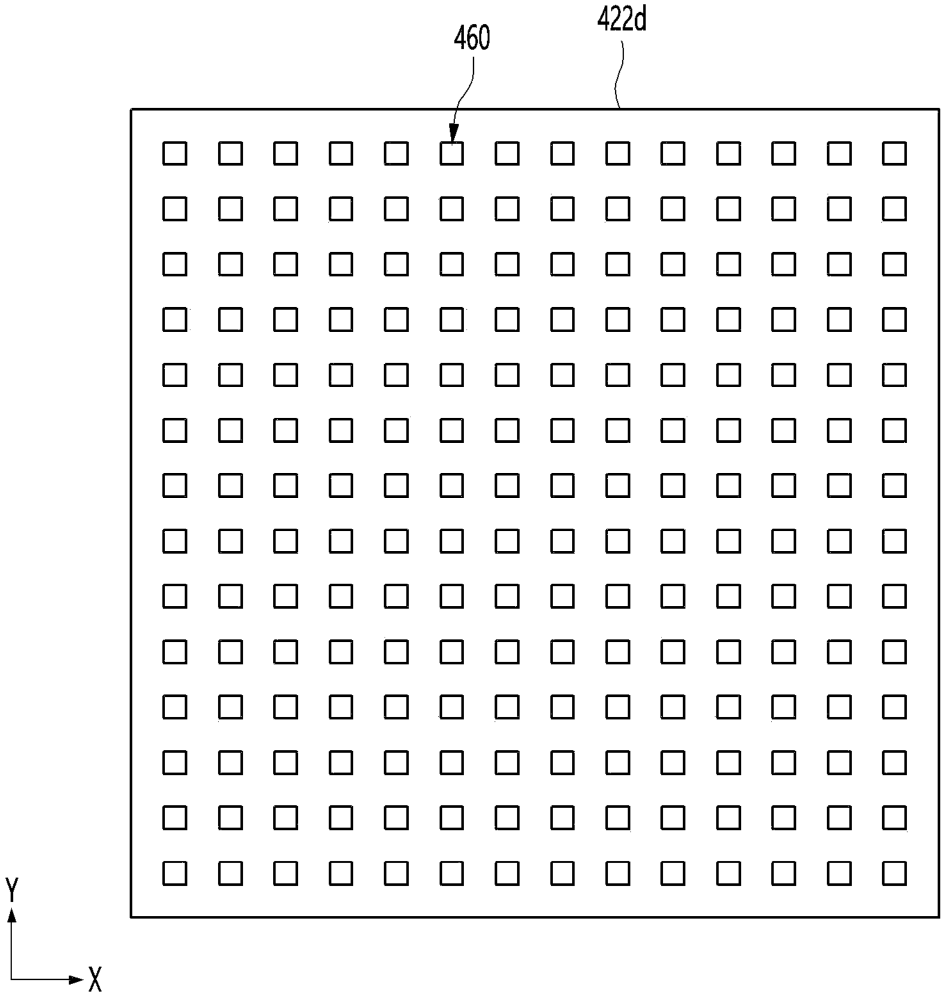
FIG. 14 is a fifth exemplary view of the shape of the magnet layer.

As a fifth example, the magnet layer 422 may include a plurality of line 422*e* crossing each other, as shown in FIG. 14. A groove 460 may be formed by a plurality of lines 422*e* crossing each other. That is, the groove 460 may be surrounded by crossing lines 422*e*. The groove 460 may be referred to as a dent, a spaced member, or a recessed member.

The plurality of lines 422*e* may include first lines extending along the X-axis direction and second lines extending along the Y-axis direction. For example, the light emitting devices 300 may stick to one surface of each of the plurality of line 422*e* or may contact the support substrate 421 through the groove 460.

In addition to the first to fifth examples, the magnet layer 422 of various shapes is possible, and the magnet layer of various shapes may also be an example of the embodiment.

Meanwhile, various implementations of the first guide part 420 are possible, and will be described in more detail with reference to FIGS. 15 to 17.

Figure 15:
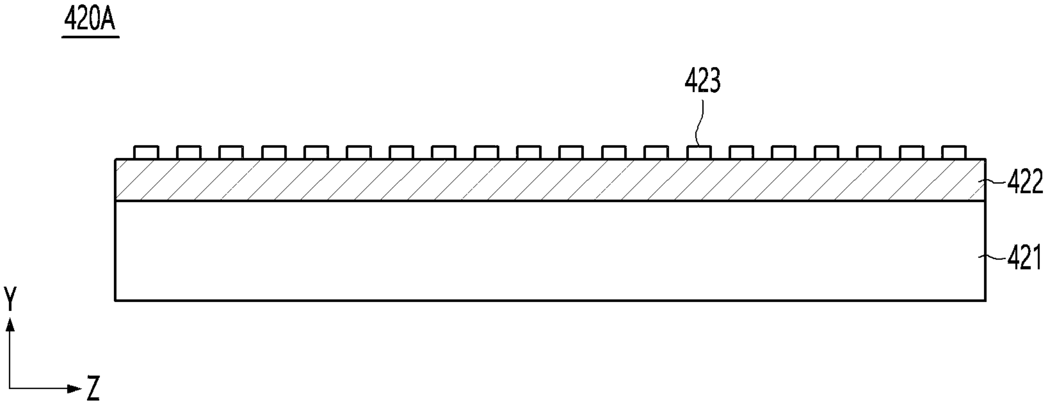
FIG. 15 is a cross-sectional view showing a first guide part according to the second embodiment.

FIG. 15 is a cross-sectional view showing a first guide part according to the second embodiment.

The second embodiment is the same as the first embodiment (FIG. 9) except for the convex pattern 423. In the second embodiment, the same reference numerals are given to elements having the same shape, structure and/or function as those in the first embodiment, and detailed descriptions will be omitted.

Referring to FIG. 15, the first guide part 420A according to the second embodiment may comprise a support substrate 421, a magnet layer 422 and a plurality of convex patterns 423.

Since the support substrate 421 and the magnet layer 422 have been described in the first embodiment, detailed descriptions are omitted.

The plurality of convex patterns 423 may be disposed on one surface of the magnet layer 422. For example, the convex pattern 423 may be integrally formed with the magnet layer 422, but is not limited thereto.

For example, the convex pattern 423 may have various shapes such as a circular shape, a rectangular shape, and a polygonal shape. For example, the area of the convex pattern 423 may be at least greater than the area of the light emitting device 300. Thus, for example, at least one light emitting device 300 may be sticked to one surface of the convex pattern 423.

For example, the convex patterns 423 may be spaced apart from each other. In this case, one or more light emitting devices 300 may be sticked to one surface of the magnet layer 422 through a separation space between the convex patterns 423.

In FIG. 15, the convex pattern 423 is shown as being disposed on the magnet layer 422 having the plate shape 422*a* shown in FIG. 10, but the convex pattern 423 may be disposed on the magnet layer having various shapes shown in FIGS. 11 to 14.

Figure 16:
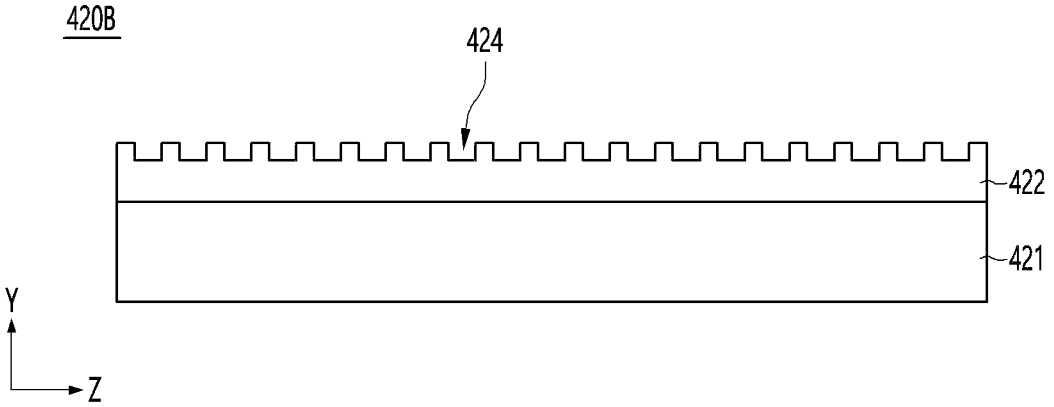
FIG. 16 is a cross-sectional view showing a first guide part according to the third embodiment.

FIG. 16 is a cross-sectional view showing a first guide part according to the third embodiment.

The third embodiment is the same as the first embodiment (FIG. 9) except for the concave pattern 424. In the third embodiment, the same reference numerals are given to elements having the same shape, structure and/or function as those in the first embodiment, and detailed descriptions will be omitted.

Referring to FIG. 16, the first guide part 420B according to the third embodiment may comprise a support substrate 421, a magnet layer 422 and a plurality of concave patterns 424.

Since the support substrate 421 and the magnet layer 422 have been described in the first embodiment, detailed descriptions are omitted.

The plurality of concave patterns 424 may be disposed on one surface of the magnet layer 422. For example, the concave pattern 424 may be integrally formed with the magnet layer 422, but is not limited thereto.

For example, the concave pattern 424 may have various shapes such as a circular shape, a rectangular shape, and a polygonal shape. For example, the area of the concave pattern 424 may be at least greater than the area of the light emitting device 300. Thus, for example, at least one light emitting device 300 may stick to one surface of the concave pattern 424.

For example, the concave patterns 424 may be spaced apart from each other. In this case, the light emitting device 300 may stick to one surface of the magnet layer 422 through a separation space between the concave patterns 424. One surface of the magnet layer 422 located in the separation space may be a protrusion, and the light emitting device 300 may be sticked to one surface of the protrusion.

In FIG. 16, the concave pattern 424 is shown as being disposed on the magnet layer 422 having the plate shape 422*a* shown in FIG. 10, but the concave pattern 424 may be disposed on the magnet layer having various shapes shown in FIGS. 11 to 14.

Figure 17:
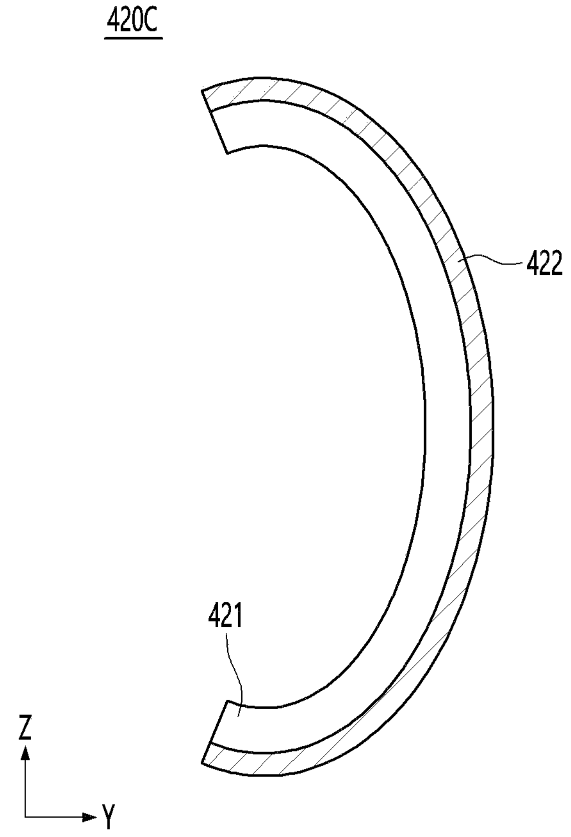
FIG. 17 is a cross-sectional view showing a first guide part according to the fourth embodiment.

FIG. 17 is a cross-sectional view showing a first guide part according to the fourth embodiment.

The fourth embodiment is the same as the first embodiment (FIG. 9) except that the first guide part 420C has a rollable characteristic. In the fourth embodiment, the same reference numerals are given to elements having the same shape, structure and/or function as those in the first embodiment, and detailed descriptions will be omitted.

Referring to FIG. 17, the first guide part 420C according to the fourth embodiment may comprise a support substrate 421 and a magnet layer 422.

For example, the support substrate 421 and the magnet layer 422 may have rollable characteristics and may be bent freely. This free bending characteristic may be adopted in a structure in which the first guide part 420C circulates in a conveyor method described later.

The magnet layer 422 having a rollable characteristic shown in FIG. 17 is a magnet layer having a plate shape (422*a* in FIG. 10), but the magnet layer 422 having a rollable characteristic may be a magnet layer having various shapes shown in FIGS. 11 to 14.

Meanwhile, referring back to FIG. 6, the display manufacturing apparatus 400 according to the embodiment may comprise a second guide part 430.

The second guide part 430 may be disposed to face the first guide part 420. For example, the second guide part 430 may face the first guide part 420 face to face. For example, the size of the second guide part 430 may be equal to or greater than the size of the first guide, but is not limited thereto.

For example, the first guide part 420 may comprise the magnet layer 422, but the second guide part 430 may not comprise the magnet layer, but is not limited thereto. In this case, the light emitting devices 300 may stick to the first guide part 420 but not stick to the second guide part 430.

The second guide part 430 may serve to help align the light emitting devices 300 sticked to the first guide part 420 in a line. That is, the second guide part 430 may serve to support the light emitting devices 300 sticked to the first guide part 420.

For example, the distance between the first guide part 420 and the second guide part 430 may be equal to or greater than the long axis length of the light emitting device 300.

Therefore, when one surface of the light emitting device 300 sticks to the first guide part 420, the other surface opposite to one surface of the light emitting device 300 may come in contact with the second guide part 430 or may be spaced apart from the second guide part 430.

For example, the light emitting device 300 sticked to the first guide part 420 may be temporarily detached from the first guide part 420. In this case, the sticked light emitting device 300 does not move far from the first guide part 420 by the second guide part 430, and may stick to the first guide part 420 again. Accordingly, the second guide part 430 can help the light emitting device 300 to be continuously aligned in a line with the first guide part 420.

When the light emitting devices 300 can be continuously aligned in a line by the first guide part 420, the second guide part 430 may be omitted.

The Second Embodiment

Figure 18:
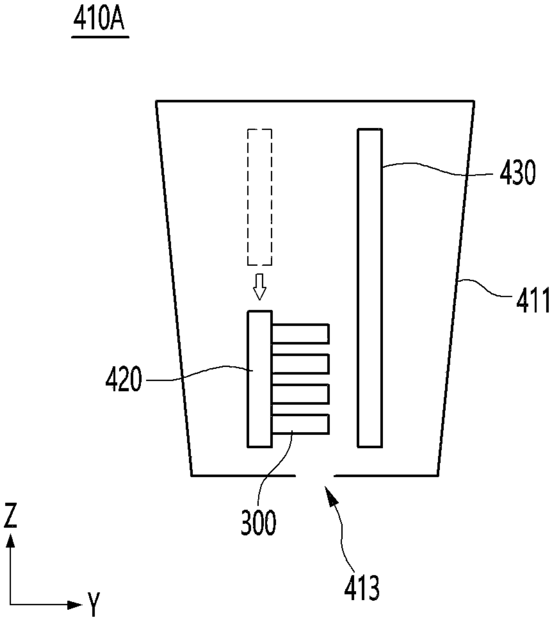
FIG. 18 is a cross-sectional view showing an inkjet head device according to the second embodiment.

FIG. 18 is a cross-sectional view showing an inkjet head device according to the second embodiment.

The second embodiment is similar to the first embodiment (FIG. 6) except that the first guide part 420 is movable in the vertical direction. In the second embodiment, the same reference numerals are given to elements having the same shape, structure and/or function as those in the first embodiment, and detailed descriptions will be omitted.

Referring to FIG. 18, the inkjet head device 410A according to the second embodiment may comprise a body 411, a nozzle 413, a first guide part 420 and a second guide part 430. When the light emitting devices 300 can be continuously aligned in a line by the first guide part 420, the second guide part 430 may be omitted.

Since the body 411, the nozzle 413, and the second guide part 430 have been described in the first embodiment (FIG. 6), a detailed description will be omitted.

The first guide part 420 may be movable in a vertical direction, that is, along the Z-axis direction.

While the first guide part 420 of the first embodiment (FIG. 6) is fixed, the first guide part 420 of the second embodiment (FIG. 18) is movable.

While the first guide part 420 is movable in the vertical direction, the second guide part 430 may be fixed, but is not limited thereto.

When the light emitting devices 300 are disposed in a random direction in the liquid in the body 411, the first guide part 420 is moved to the upper side of the body 411 such that the light emitting devices 300 having these random directions may be aligned in a line by sticking to the first guide part 420. The first guide part 420 to which the light emitting devices 300 are sticked may be moved downward to be adjacent to the nozzle 413. Thereafter, the light emitting devices 300 arranged in a line on the first guide part 420 moved in the downward direction may be dropped onto the substrate 500 in units of droplets 431 through the nozzle 413. Accordingly, there may be no light emitting device 300 sticking to the first guide part 420 moved near the nozzle 413. After that, the first guide part 420 is moved upward again such that the light emitting devices 300 disposed on the upper side of the body 411 and having random directions may stick to the first guide part 420. As such, the first guide part 420 reciprocates in the vertical direction such that the light emitting devices 300 in the body 411 may be placed on the substrate 500 while being aligned in a line. Accordingly, since the uniformity of luminance of each sub-pixel of the substrate 500 is secured, and the degree of alignment of the light emitting device 300 in each sub-pixel of the substrate 500 is increased, the luminance can be improved.

Meanwhile, the first guide part 420 may include an electromagnet. In this case, when the first guide part 420 is moved to the lower side of the body 411 and sprayed through the nozzle 413, the supply of the current flowing through the coil wound on the electromagnet may be blocked, and the light emitting devices 300 sticked to the electromagnet may be detached. When the light emitting devices 300 are detached from the electromagnet and the first guide part 420 is moved to the upper side of the body 411, current is supplied to the coil wound on the electromagnet. Thus, the light emitting devices 300 randomly arranged on the upper side of the body 411 can be sticked to the electromagnet in a line by the magnetic force formed on the electromagnet.

The Third Embodiment

Figure 19:
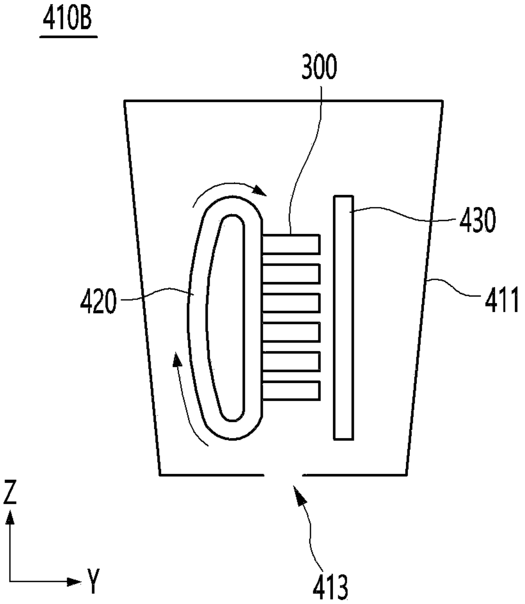
FIG. 19 is a cross-sectional view showing an inkjet head device according to the third embodiment.

FIG. 19 is a cross-sectional view showing an inkjet head device according to the third embodiment.

The third embodiment is similar to the first embodiment (FIG. 6) except that the first guide part 420 is circulated in a conveyor manner. In the third embodiment, the same reference numerals are given to elements having the same shape, structure and/or function as those in the first embodiment, and detailed descriptions will be omitted.

Referring to FIG. 19, the inkjet head device 410B according to the third embodiment may comprise a body 411, a nozzle 413, a first guide part 420 and a second guide part 430. When the light emitting devices 300 are continuously aligned in a line by the first guide part 420, the second guide part 430 may be omitted.

Since the body 411, the nozzle 413, and the second guide part 430 have been described in the first embodiment (FIG. 6), a detailed description will be omitted.

The first guide part 420 may be connected to a rotation driving circuit (not shown) and circulate in a conveyor manner by an operation of the rotation driving circuit.

For example, when the first guide part 420 is disposed on the left side of the second guide part 430, the first guide part 420 may be circulated in a clockwise direction. In this case, the first guide part 420 is opposed to the second guide part 430 and moves from the upper side to the lower side, and the light emitting devices 300 sticked to the first guide part 420 and moved downward may be dropped onto the substrate 500 through the nozzle 413. The first guide part 420 opposite to the second guide part 430 may maintain a certain distance from the first guide part 420 while moving from the upper side to the lower side. Accordingly, even if the light emitting devices 300 are temporarily detached from the first guide part 420, they can be guided by the second guide part 430 and stick to the first guide part 420 again.

The first guide part 420 from which the light emitting devices 300 are detached due to the drop on the substrate 500 is circulated in a clockwise direction, and may move away from the second guide part 430. At this time, the light emitting devices 300 randomly disposed in the body 411 may stick to the empty area of the first guide part 420 from which the light emitting devices 300 were previously detached.

The first guide part 420 is circulated in a clockwise direction such that the light emitting devices 300 sticked to the corresponding empty area oppose the second guide part 430 and move from upper to lower side. Then, the light emitting devices 300 may be dropped on the substrate 500 through the nozzle 413. In this way, the first guide part 420 is circulated by a conveyor method such that the light emitting devices 300 in the body 411 may be put on the substrate 500 in a state of being aligned in a line. Accordingly, since the uniformity of luminance of each sub-pixel of the substrate 500 is secured, and the degree of alignment of the light emitting device 300 in each sub-pixel of the substrate 500 is increased, the luminance can be improved.

The light emitting device 300 of the above embodiment may be one of a nano light emitting device, a micro light emitting device, a disk light emitting device, a cylindrical light emitting device, and a rod light emitting device.

Meanwhile, the light emitting device 300 may comprise a magnetic layer 312 to stick the abnormally-aligned light emitting device to a collecting part. Referring to FIGS. 20 to 31, a method of manufacturing a light emitting device will be described.

FIGS. 20 to 31 show a method of manufacturing a light emitting device according to the first embodiment.

Figure 20:
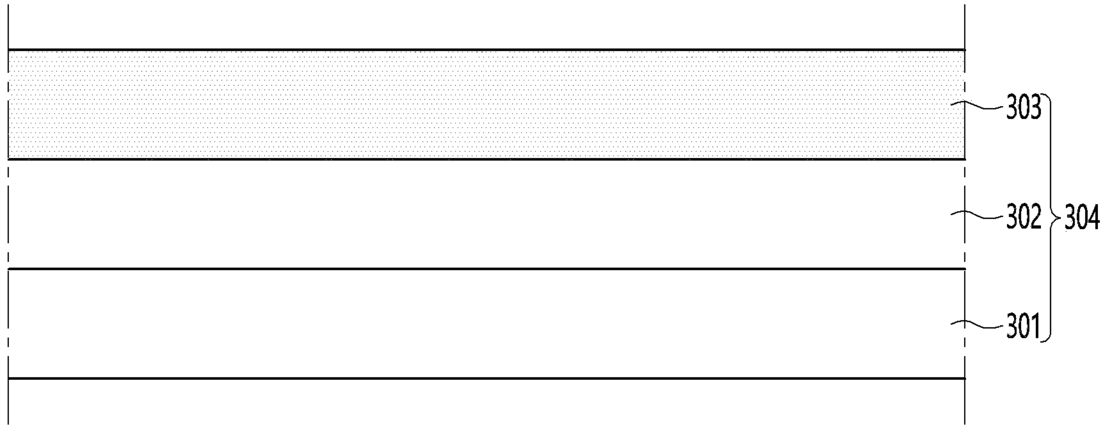
FIGS. 20 to 31 show a method of manufacturing a light emitting device according to the first embodiment.

As shown in FIG. 20, a lower substrate 304 may be prepared. A conductive semiconductor layer 303 may be formed on a substrate 301 to prepare a lower substrate 304.

The conductive semiconductor layer 303 may be an n-type semiconductor layer, but is not limited thereto.

The substrate 301 may include a sapphire substrate such as $Al_2O_3$ and a transparent substrate such as glass, but is not limited thereto. The substrate 301 may be made of a conductive substrate such as GaN, SiC, ZnO, Si, GaP, and GaAs. Hereinafter, a case in which the lower substrate 304 is a sapphire substrate ($Al_2O_3$) will be described as an example.

A plurality of conductive semiconductor layers are formed on the substrate 301. The plurality of conductive semiconductor layers may be grown through an epitaxial method. That is, a seed crystal is formed, a semiconductor material is deposited to grow the plurality of conductive semiconductor layers. Here, the semiconductor layer may be formed by electron beam deposition, physical vapor deposition (PVD), chemical vapor deposition (CVD), plasma laser deposition (PLD), dual-type thermal evaporation, sputtering, metal-organic chemical vapor deposition (MOCVD), or the like. Preferably, the semiconductor layer of the embodiment may be formed by metal-organic chemical vapor deposition (MOCVD), but is not limited thereto.

Meanwhile, at least a buffer layer 302 may be further included between the substrate 301 and the conductive semiconductor layer 303. As shown in FIG. 20, a buffer layer 302 may be formed on the substrate 301 and the conductive semiconductor layer 303 may be formed on the buffer layer 302.

The buffer layer 302 may be included to reduce a difference in lattice constant between the substrate 301 and the conductive semiconductor layer 303.

The conductive semiconductor layer 303 may be directly formed on the substrate 301. Alternatively, the buffer layer 302 is formed to provide seed crystals such that the conductive semiconductor layer 303 can be smoothly grown. For example, the buffer layer 302 may be an undoped semiconductor layer. The undoped semiconductor layer may include the same material as the first sub-semiconductor layer, but may be an undoped material. For example, the undoped semiconductor layer may be at least one of InAlGaN, GaN, AlGaN, InGaN, AlN, and InN that is not doped, but is not limited thereto. Hereinafter, a case where an undoped semiconductor layer is formed as the buffer layer 302 on the substrate 301 will be described.

Figure 21:
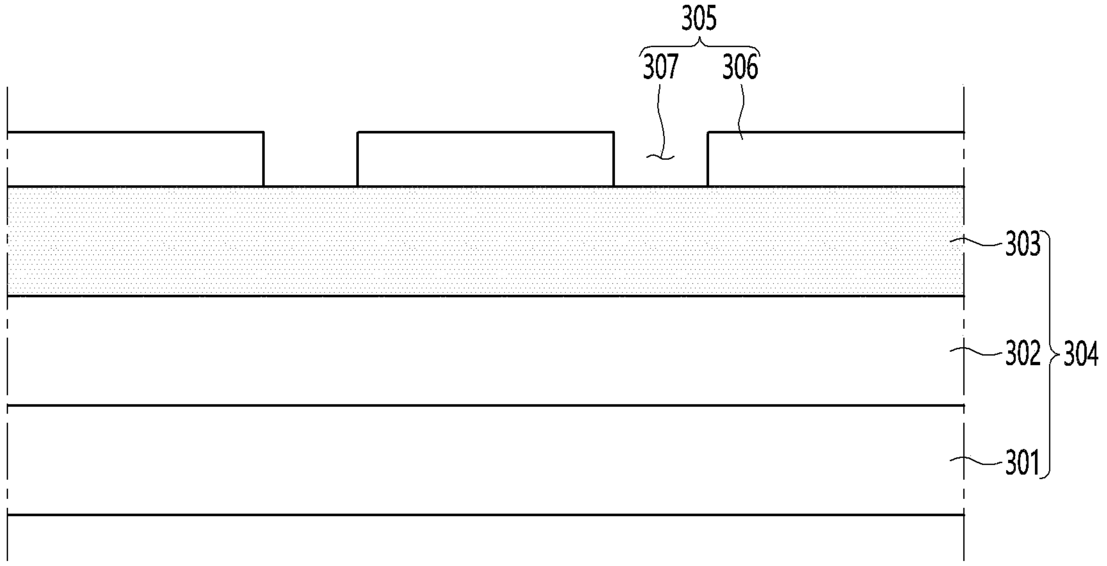

As shown in FIG. 21, a first mask layer 305 may be formed. The first mask layer 305 may include a plurality of mask patterns 306 and be formed on at least a partial region of the lower substrate 304. The plurality of mask patterns 306 may be spaced apart from each other to form a first mask layer 305. The first mask layer 305 may include a region where the mask pattern 306 is disposed and an opening 307 in which the plurality of mask patterns 306 are spaced apart from each other. A crystal of the conductive semiconductor layer 303 may be grown through the opening 307 of the first mask layer 305. The mask pattern 306 of the first mask layer 305 may include at least one of an insulating material and a conductive material. For example, the insulating material may be silicon oxide (SiOx), silicon nitride (SiNx), silicon oxynitride (SiOxNy), or the like, and the conductive material may be ITO, IZO, IGO, ZnO, graphene, graphene oxide, or the like, but is not limited thereto.

When the crystal of the conductive semiconductor layer 303 is grown, defects may be formed in the grown semiconductor layer because it is not single-crystallized at the grain interface of the crystal. The defects may be a factor that impairs electron mobility in the semiconductor layers 310 and 320 of a light emitting device 300 or luminous efficiency of the light emitting device 300.

In the embodiment, when the crystal of the conductive semiconductor layer 303 is grown by forming the first mask layer 305, as the growth of defects in the grain interface is hindered by the mask pattern 306, only defects formed in the opening 307 remain. Thus, the number of defects formed in a finally formed first semiconductor layer 308 can be reduced.

In addition, as shown in FIG. 21, when the light emitting device 300 is separated from the substrate 301 or the lower substrate 304, the first mask layer 305 may be etched and removed along with the substrate 301 or the lower substrate 304. Accordingly, a separation surface of the light emitting device 300 formed on the mask pattern 306 of the first mask layer 305 may have the same shape as a surface of the mask pattern 306. That is, the separation surface of the light emitting device 300 may have various shapes depending on the pattern of the first mask layer 305 and the shape or structure of the mask pattern 306.

Figure 22:
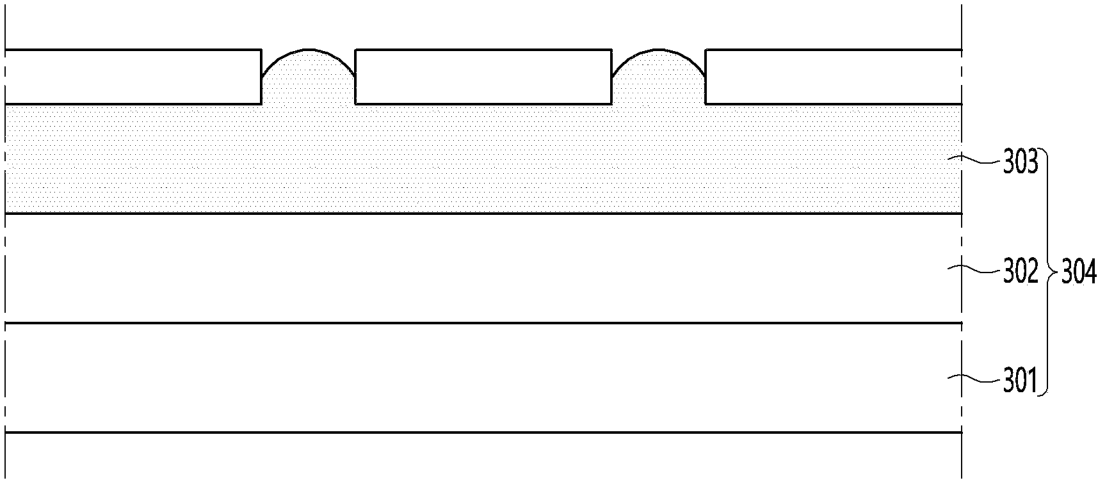
Figure 23:
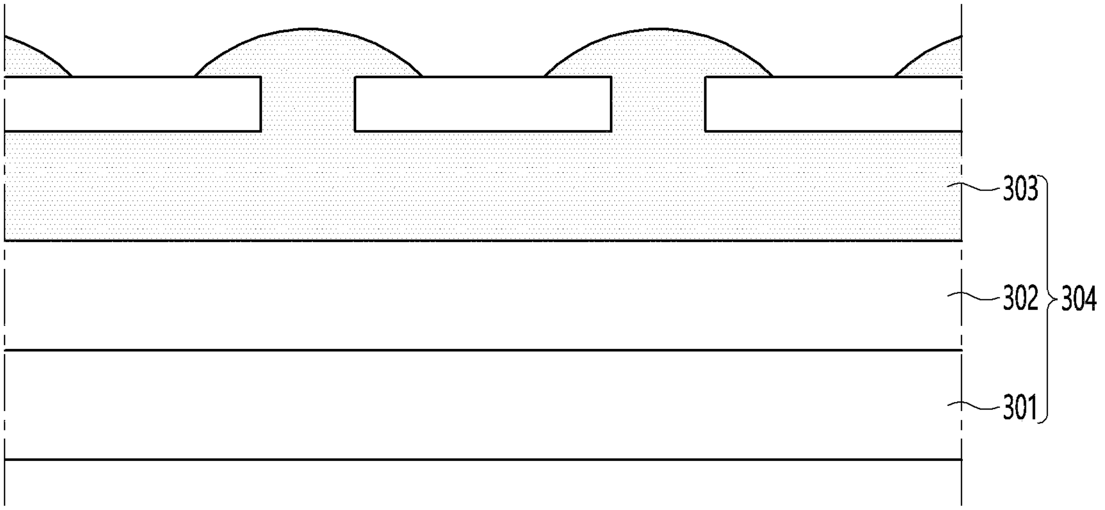

As shown in FIG. 22, crystals of the conductive semiconductor layer 303 in a region overlapped with the opening 307 may be grown in a vertical direction to grow to the same thickness as the mask pattern 306. As shown in FIG. 23, crystals grown in the opening 307 grow in a horizontal direction toward the upper side of the mask pattern 306 to spread the crystals of the conductive semiconductor layer 303.

Figure 24:
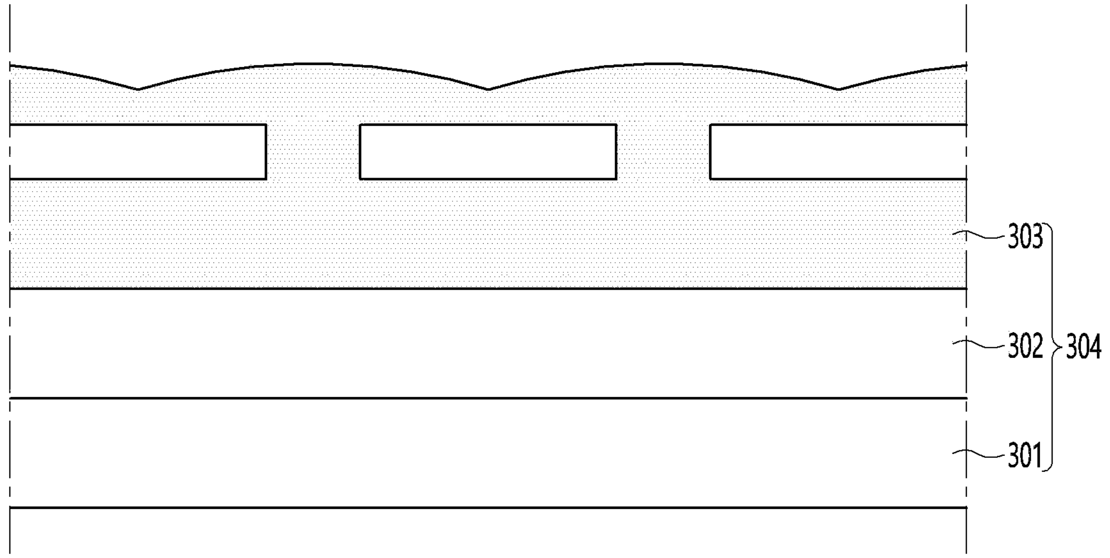

As shown in FIG. 24, a portion of the first conductive semiconductor layer 308 may be formed by merging crystals of the conductive semiconductor layer 303 in a partial region on the mask pattern 306. A region where the crystals of the conductive semiconductor layer 303 are merged on the mask pattern 306 becomes a grain interface such that defects may be formed. However, defects formed in a region overlapped with the mask pattern 306 may not grow, and the number of defects in the finally formed first semiconductor layer 308 may be reduced.

Figure 25:
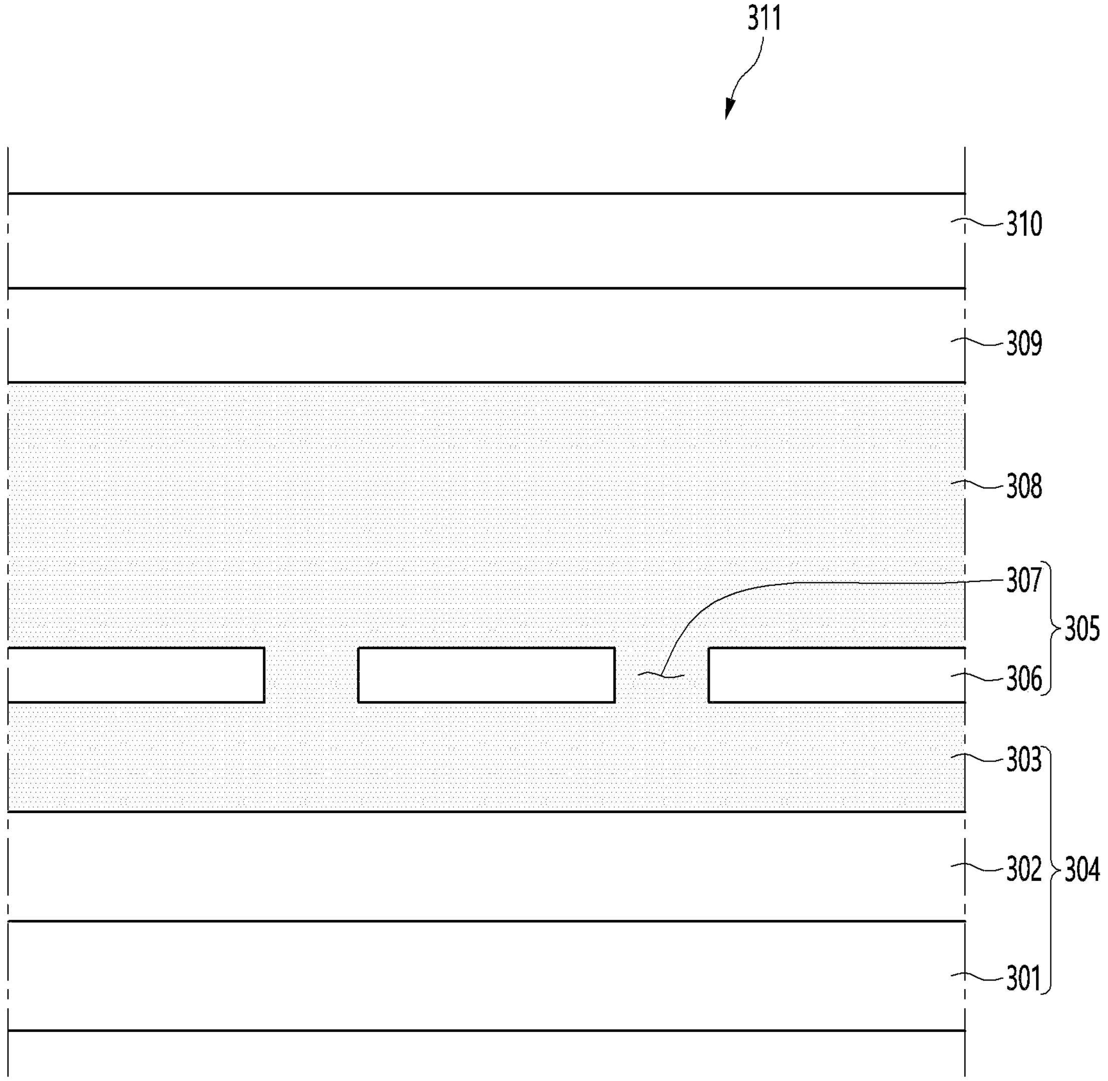

As shown in FIG. 25, when the crystal of the conductive semiconductor layer 303 is grown to form the first conductive semiconductor layer 308, an active layer 309 and a second conductive semiconductor layer 310 are stacked on the first conductive semiconductor layer 308 to form a device stack 311. Except that the first mask layer 305 is formed and grown through the opening 307, the active layer 309 and the second conductive semiconductor layer 310 are grown in the same way as the first conductive semiconductor layer 308. A detailed description will be omitted.

Meanwhile, the light emitting device 300 may further include a magnetic layer 312 on at least one of the first semiconductor layer 308 and the second semiconductor layer 310.

Figure 26:
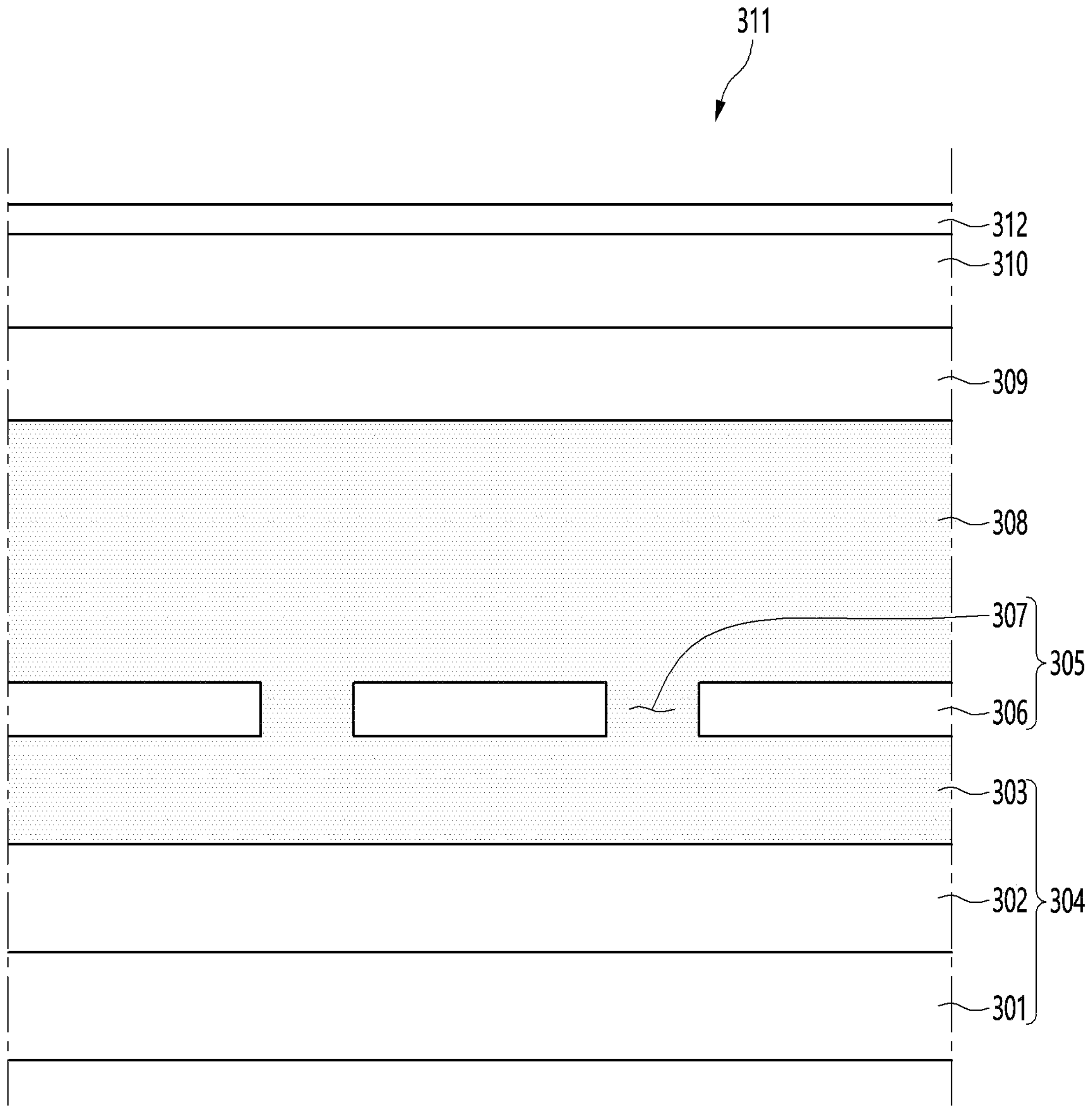

As shown in FIG. 26, the magnetic layer 312 may be formed on the second conductive semiconductor layer 310 of the device stack 311. The magnetic layer 312 may be made of a metal having a magnetic property. For example, the magnetic layer 312 may include nickel (Ni) or iron (Fe), or the like but is not limited thereto. Due to the magnetic layer 312 of the light emitting device 300, the light emitting device 300 may stick to a collecting part due to the magnetic force of the collecting part. For example, the magnetic layer 312 may be an electrode that allows current to flow through the second conductive semiconductor layer 310. When the magnetic layer 312 is an electrode, current may flow to the second conductive semiconductor layer 310 through the magnetic layer 312.

Although not shown, at least one electrode layer may be formed between the second conductive semiconductor layer 310 and the magnetic layer 312, but is not limited thereto.

Figure 27:
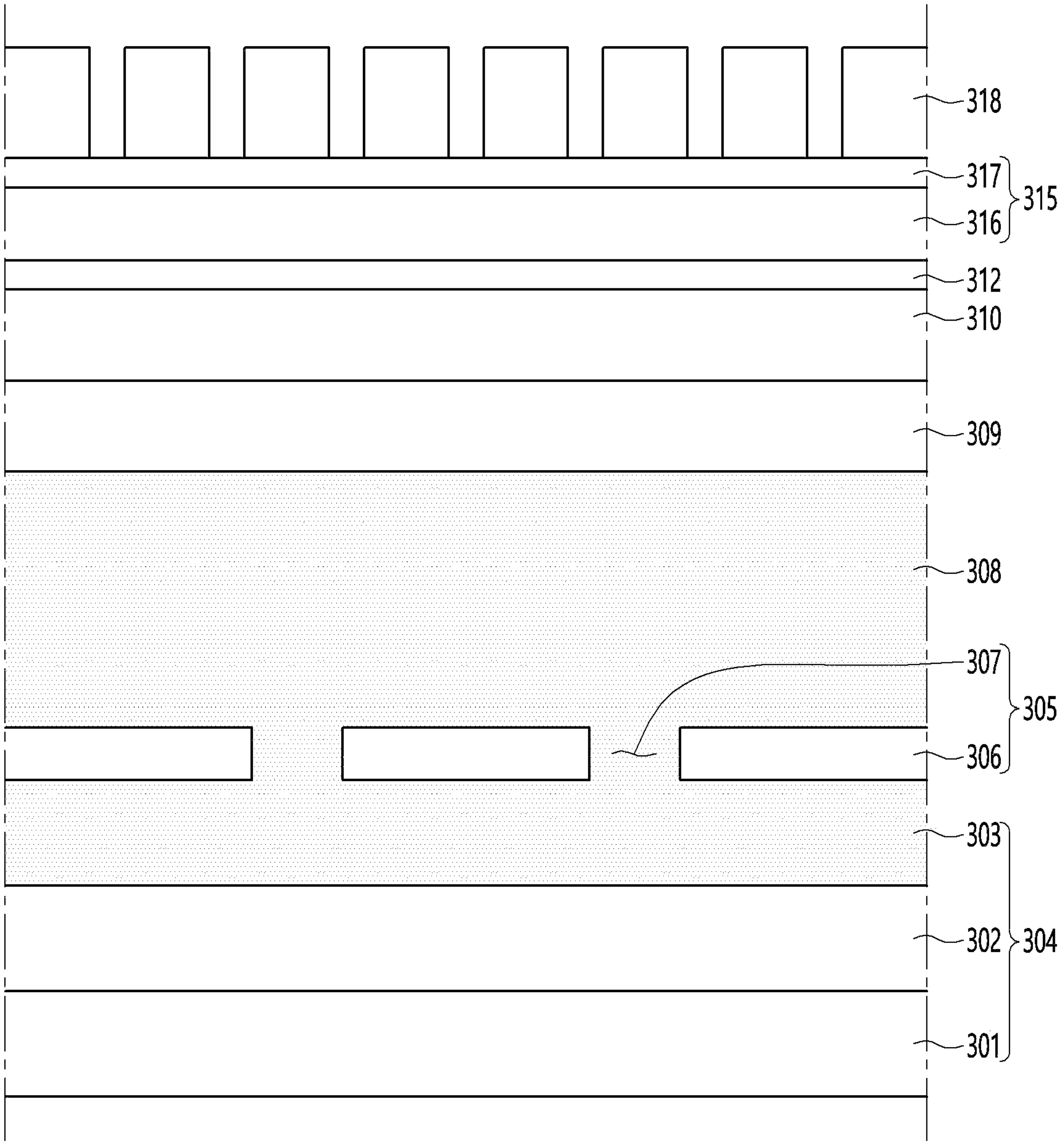
Figure 28:
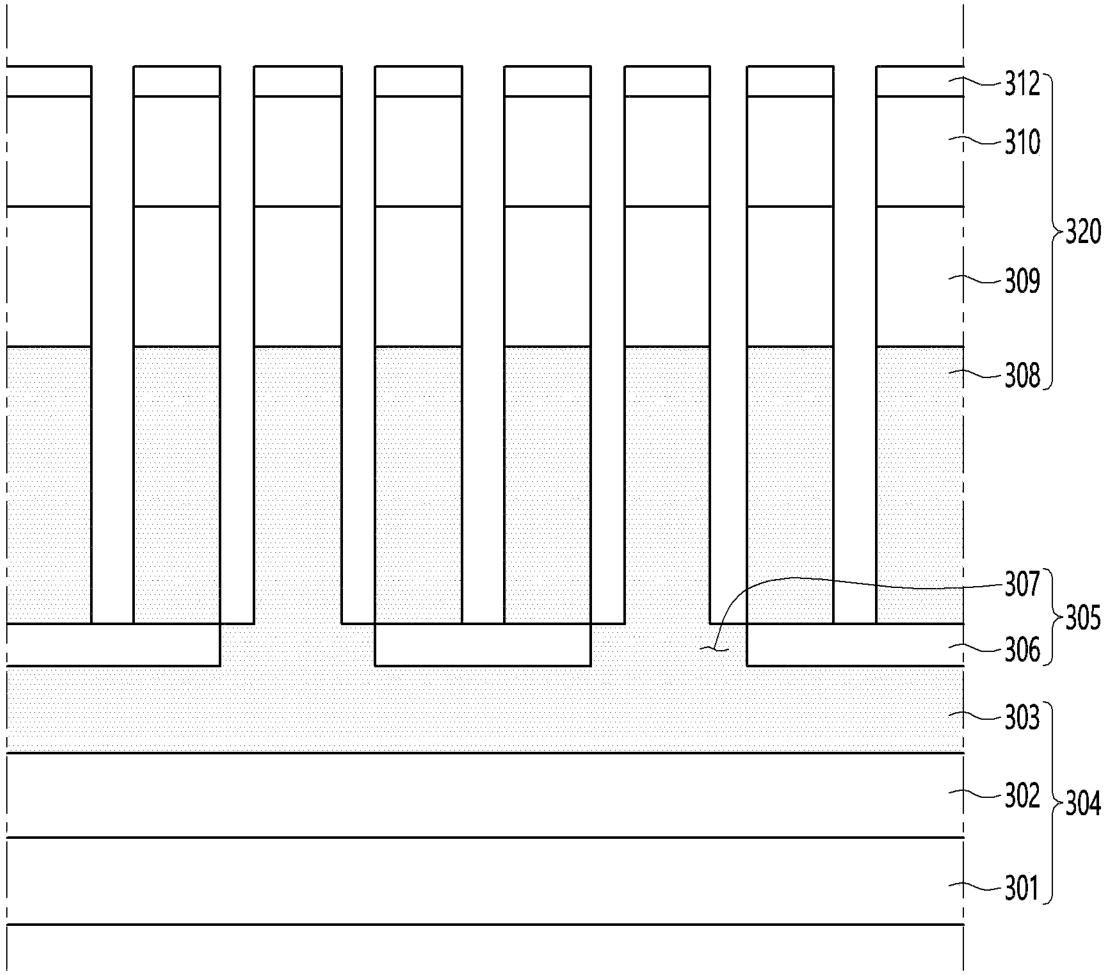

The device stack 311 may be etched in a vertical direction to form the device rod 320 (FIGS. 27 and 28). For example, after a second mask layer 315 including the hard mask layers 316 and 317 and a nano pattern layer 318 is formed on the device stack 311, the device stack layer 311 may be etched using the second mask layer 315 to form the device rod 320.

As shown in FIG. 27, the hard mask layers 316 and 317 and the nano pattern layer 318 may be formed on the second conductive semiconductor layer 310 of the device stack 311. The hard mask layers 316 and 317 may be referred to as a second mask layer 315. The second mask layer 315 may include the nano pattern layer 318 as well as the hard mask layers 316 and 317.

The hard mask layers 316 and 317 serve as masks for successive etching of the first conductive semiconductor layer 308, the active layer 309, and the second conductive semiconductor layer 310 included in the device stack 311. The hard mask layers 316 and 317 may include a first layer including an insulating material and a second layer including a metal.

An insulating material included in the first layer 316 may use oxide or nitride. For example, the first layer 316 may include silicon oxide (SiOx), silicon nitride (SiNx), silicon oxynitride (SiOxNy), or the like. The thickness of the first layer 316 may range from 0.5 μm to 1.5 μm, but is not limited thereto.

The second layer 317 is a material that can serve as a mask for continuous etching of the device stack 311, but is not limited thereto. For example, the second layer 317 may include chromium (Cr) or the like. The thickness of the second layer 317 may range from 30 nm to 150 nm, but is not limited thereto.

The nano pattern layer 318 may be formed on the hard mask layers 316 and 317. In the nano pattern layer 318, at least one nano-pattern may be spaced apart from each other. The nano pattern layer 318 may serve as a mask for continuous etching of the device stack 311 with nano-patterns spaced apart from each other. The nano pattern layer 318 is not particularly limited as long as it can form a pattern including polymer, polystyrene spheres, silica spheres, and the like.

For example, when the nano pattern layer 318 includes a polymer, a method for forming a pattern using a polymer may be employed. For example, the nano pattern layer 318 including a polymer may be formed using a method such as photolithography, e-beam lithography, nanoimprint lithography, or the like.

In particular, the structure, shape, and spacing of the nano pattern layer 318 may be related to the shape of the light emitting device 300 finally manufactured. However, as described above, since the shape of the light emitting device 300 may vary, the structure of the nano pattern layer 318 is not particularly limited. For example, when the nano pattern layers 318 have circular patterns spaced apart from each other, the device rod 320 manufactured by vertically etching the device stack 311 may have a cylindrical shape. Accordingly, the light emitting device 300 separated from the substrate 301 or the lower substrate 304 may have a cylindrical shape, but is not limited thereto.

As shown in FIG. 28, when the second mask layer 315 is formed on the device stack 311, a region where the nano pattern layer 318 is formed is not etched and a region where nano-patterns of the nano pattern layer 318 is spaced apart is etched in a vertical direction to form a hole. The hole may be selectively formed in a region from the hard mask layers 316 and 317 to the first mask layer 305.

A method of forming a hole by etching the device stack 311 may be performed using a general method. For example, the etching process may include dry etching, wet etching, reactive ion etching (RIE), inductively coupled plasma reactive ion etching (ICP-RIE), or the like. In the case of the dry etching method, anisotropic etching is possible and may be suitable for forming a hole by vertical etching. In the case of using the above-described etching method, the etching etchant may be $Cl_2$ or $O_2$, but is not limited thereto.

In an embodiment, etching of the device stack 311 may be performed by using a dry etching method and a wet etching method. For example, after etching in the depth direction by a dry etching method, sidewalls etched through a wet etching method, which is isotropic etching may be placed on a plane perpendicular to the surface.

The second mask layer 315 remaining on the upper side of the vertically etched device stack 311 is removed through a general method, for example, a dry etching method or a wet etching method to form the device rod 320.

An insulating layer 321 may be formed on the device rod 320 and the mask pattern 306 may be removed. Accordingly, at least a portion of the device rod 320 is separated from the substrate 301 or the lower substrate 304 to manufacture the light emitting device 300 (FIGS. 29 to 31).

The insulating layer 321 may be made of an insulating material formed on an outer surface of the device rod 320. The insulating film 321 may be formed by applying or immersing an insulating material on the outer surface of the vertically etched device rod 320, but is not limited thereto. For example, the insulating film 321 may be formed by atomic layer deposition (ALD). The insulating film 321 may be formed as the insulating layer 380 of the light emitting device 300. As described above, the insulating layer 321 may be silicon oxide (SiOx), silicon nitride (SiNx), silicon oxynitride (SiOxNy), aluminum oxide ($Al_2O_3$), aluminum nitride (AlN), or the like.

Figure 29:
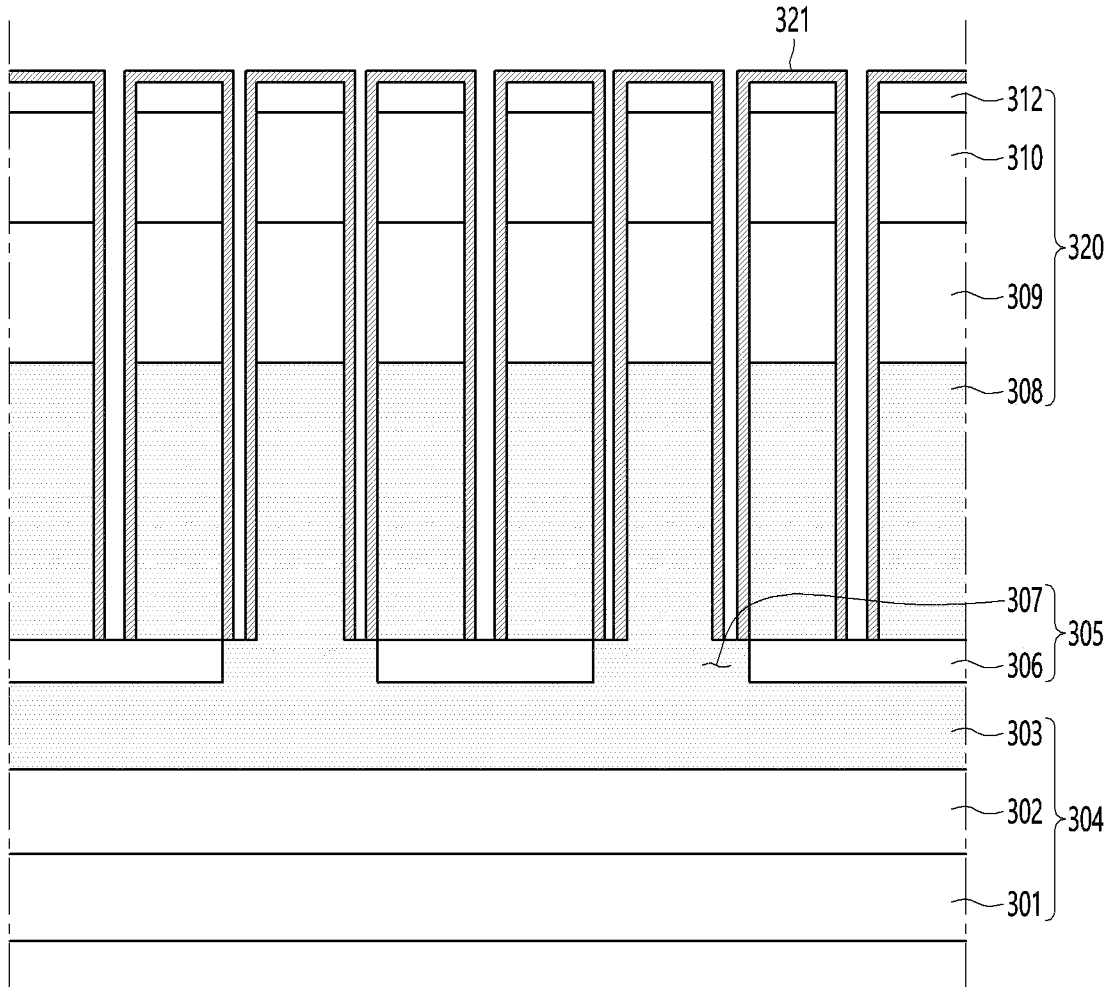
Figure 30:
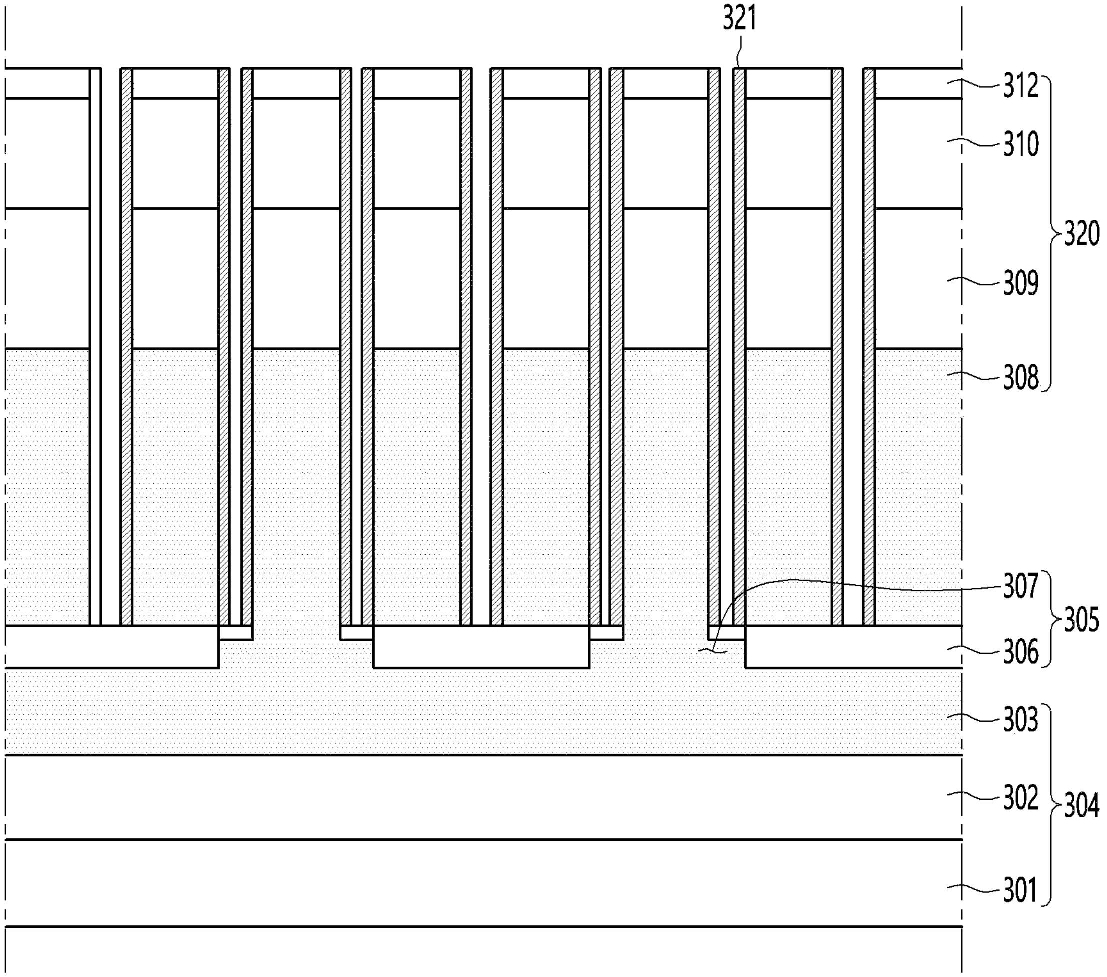

As shown in FIG. 29, the outer surface of the device rod 320 and the device rod 320 are etched apart from each other such that the insulating layer 321 may be formed on a partial surface of the mask pattern 306 exposed to the outside. When the insulating film 321 is formed on the magnetic layer 312, which is the upper surface of the device rod 320, electrical connections between the first conductive semiconductor layer 308 and the second conductive semiconductor layer 310 and the first and second electrodes (210 and 220 in FIG. 8) of the substrate 500 may be insulated. Accordingly, a portion of the insulating film 321 formed in a direction perpendicular to the longitudinal direction of the device rod 320, that is, in a direction parallel to the substrate 301 or the lower substrate 304 needs to be removed. That is, as shown in FIG. 30, at least the insulating film 321 disposed on the upper surface of the device rod 320 needs to be removed to expose the upper surface of the device rod 320. To this end, a process such as dry etching or etch-back, which is anisotropic etching, may be performed.

As shown in FIG. 31, the mask pattern 306 is removed and at least a portion of the device rod 320 is separated from the substrate 301 or the lower substrate 304 to manufacture the light emitting device 300. The mask pattern 306 may be dissolved by an etchant such as hydrofluoric acid (HF). Therefore, the mask pattern 306 is dissolved and the device rod 320 formed on the mask pattern 306 of the first mask layer 305 is chemically lifted off from the lower substrate 304 such that the light emitting device 300 may be fabricated. Since the light emitting device 300 is separated by dissolving and removing the mask pattern 306, the separation surface may be relatively flat. That is, a separation surface, which is a surface from which the device rod 320 is separated from the lower substrate 304, may be substantially flat and parallel to the upper surface of the second conductive semiconductor layer 310.

In contrast, the device rod 320 formed on the opening 307 of the first mask layer 305 remains unseparated. As shown in FIG. 31, the device rod 320 formed on the opening 307 of the first mask layer 305 may be separated from the substrate 301 or the lower substrate 304 through a physical method. In the light emitting device 300 manufactured through the above method, the separation surface, which is a surface separated from the substrate 301, may have a concavo-convex structure or may have a partially inclined region.

The light emitting device 300 manufactured according to an embodiment is formed on the mask pattern 306 of the first mask layer 305 disposed in a partial region of the device stack 311, and is separated by a chemical method such that the separation surface can be flat.

That is, the device rod 320 formed through crystal growth may be separated from the substrate 301 and the separation surface may be planarized simultaneously.

Referring to FIG. 31, the first mask layer 305 formed on the lower substrate 304 may be removed by etching and the device rod 320 may be separated. The device rod 320 formed on the mask pattern 306 of the first mask layer 305 may be separated by etching, and the device rod 320 formed on the opening 307 may be separated through a physical method.

Here, the light emitting devices 300 separated from each other on the mask pattern 306 or the opening 307 may have different separation surface.

As described above, in the light emitting device 300 according to the first embodiment, the magnetic layer 312 may be formed on the second conductive semiconductor layer 310.

Although not shown, the magnetic layer 312 may be formed on the first conductive semiconductor layer 308.

FIG. 32 is a cross-sectional view showing a light emitting device according to the second embodiment.

The second embodiment may be the same as the first embodiment except that the blocking layer 313 is added. Therefore, in the second embodiment, elements having the same shape, the same reference numerals are given to elements having the same shape, structure and/or function as those in the first embodiment, and detailed descriptions will be omitted.

Referring to FIG. 32, the light emitting device 300 according to the second embodiment may comprise a first conductive semiconductor layer 308, an active layer 309, a second conductive semiconductor layer 310, a magnetic layer 312, and a blocking layer 313, and an insulating layer 321.

Since the first conductive semiconductor layer 308, the active layer 309, the second conductive semiconductor layer 310, the magnetic layer 312, and the insulating layer 321 have been described in the first embodiment, detailed descriptions will be omitted.

The blocking layer 313 may be disposed adjacent to the magnetic layer 312. For example, the blocking layer 313 may be disposed on the outer surface of the magnetic layer 312.

For example, the blocking layer 313 may be disposed in contact with the magnetic layer 312. For example, at least one electrode layer may be disposed between the magnetic layer 312 and the blocking layer 313. At least one electrode layer may be made of metal. For example, at least one electrode layer and/or magnetic layer 312 of the light emitting device 300 may be in contact with one of the first electrode 210 and the second electrode 220 on the substrate 500. Accordingly, a voltage may be applied to the second conductive semiconductor layer 310 through at least one electrode layer and the magnetic layer 312.

The blocking layer 313 prevents the abnormally aligned light emitting devices disposed on the substrate 500 from being positioned on the first electrode 210 or the second electrode 220 as much as possible such that the blocking layer 313 can play a role in easily collecting abnormally aligned light emitting devices.

For example, a magnetic layer (not shown) may be disposed around the first electrode 210 or the second electrode 220 on the substrate 500 to increase the alignment possibility of the light emitting device 300. For example, the magnetic layer may be disposed on the same plane as the first electrode 210 or the second electrode 220 and contact the first electrode 210 or the second electrode 220. For example, the magnetic layer may be disposed on a portion of the upper surface of one of the first electrode 210 or the second electrode 220. In addition, it is possible to arrange various magnetic layers, and such an arrangement structure may also be included in the embodiment. Since the magnetic layer is fixed on the substrate 500, the light emitting device 300 may stick to the magnetic layer due to the magnetic force between the magnetic layer and the magnetic layer 312 of the light emitting device 300 such that the corresponding light emitting device 300 can be aligned between the first electrode 210 and the second electrode 220.

Meanwhile, there may be alight emitting device 300 that is not aligned between the first electrode 210 and the second electrode 220 even when pulled by the magnetic layer. This light emitting device 300 is also an abnormally aligned light emitting device and must be collected. However, since the magnetic layer 312 of the light emitting device 300 sticks to the magnetic layer due to the magnetic layer, it may be difficult to collect the light emitting device 300. As in the embodiment, the blocking layer 313 is disposed adjacent to the magnetic layer 312 of the light emitting device 300 such that the magnetic layer 312 is prevented from sticking to the magnetic layer on the substrate 500 by the blocking layer 313. Accordingly, the magnetic layer 312 of the light emitting device 300 may be spaced apart from the magnetic layer on the substrate 500. Therefore, since the light emitting device 300 does not stick to the magnetic layer, the collection of the light emitting device 300 can be facilitated.

Although not shown, in order to increase the collection rate, ultrasonic vibration is applied to the abnormally aligned light emitting devices to increase the degree of freedom of the abnormally aligned light emitting devices, and then the abnormally aligned light emitting devices may be collected using a magnet.

The blocking layer 313 may be made of an insulating material or metal that does not have a magnetic property.

For example, when the blocking layer 313, at least one electrode layer, and the magnetic layer 312 are made of metal, and the blocking layer 313, the at least one electrode layer, and the magnetic layer 312 contact the first electrode 210 or the second electrode (220), a voltage applied to the first electrode 210 or the second electrode 220 may flow to the second conductive semiconductor layer 310 through the blocking layer 313, at least one electrode layer, and the magnetic layer 312.

Meanwhile, when the magnetic layer 312 is disposed adjacent to the first conductive semiconductor layer 308, the blocking layer 313 is also disposed adjacent to the magnetic layer 312 disposed adjacent to the first conductive semiconductor layer 308.

The above detailed description should not be construed as limiting in all respects and should be considered illustrative. The scope of the embodiment should be determined by reasonable interpretation of the appended claims, and all changes within the equivalent range of the embodiment are included in the scope of the embodiment.

The embodiment can be adopted in the display field for displaying images or information.

The invention claimed is:

1. An inkjet head device, comprising:

a body comprising cylindrical light emitting devices;

a first guide part disposed within the body and comprising a support substrate and a magnet layer disposed on the support substrate;

a second guide part disposed to face the magnet layer; and a nozzle installed on a lower side of the magnet layer and the second guide part to spray the cylindrical light emitting devices onto the substrate in units of droplets, wherein the magnet layer and the second guide part are disposed parallel to each other along a direction perpendicular to an upper surface of the substrate, wherein one side surfaces of the cylindrical light emitting devices are configured to stick to an inner surface of the magnet layer, and the other side surfaces of the cylindrical light emitting devices are disposed to be spaced apart from an inner surface of the second guide part, so that the cylindrical light emitting devices are aligned in a row between the magnet layer and the second guide part and guided toward the nozzle, and wherein an array direction of the cylindrical light emitting devices aligned in the row coincides with the direction perpendicular to the upper surface of the substrate.

2. The inkjet head device of claim 1, wherein the magnet layer has a plate shape.

3. The inkjet head device of claim 1, wherein the magnet layer includes a plurality of dots arranged in a matrix.

4. The inkjet head device of claim 1, wherein the magnet layer includes a plurality of lines arranged long along a vertical direction.

5. The inkjet head device of claim 1, wherein the magnet layer includes a plurality of lines arranged long along a horizontal direction.

6. The inkjet head device of claim 1, wherein the magnet layer includes a plurality of lines crossing each other.

7. The inkjet head device of claim 1, wherein the magnet layer includes one of a permanent magnet or an electromagnet.

8. The inkjet head device of claim 1, wherein the light emitting device comprises at least one magnetic layer.

9. The inkjet head device of claim 8, wherein the at least one magnetic layer is a metal having a magnetic property.

10. The inkjet head device of claim 8, wherein the light emitting device comprises:

a first conductive semiconductor layer;

a second conductive semiconductor layer; and an active layer between the first conductive semiconductor layer and the second conductive semiconductor layer, and wherein the at least one magnetic layer is disposed adjacent to at least one of the first conductive semiconductor layer and the second conductive semiconductor layer.

* * * * *